(12) United States Patent
Willison

(10) Patent No.: US 12,054,198 B2
(45) Date of Patent: Aug. 6, 2024

(54) ELECTRIC VEHICLES INCORPORATING FLATBEDS AND METHODS ASSOCIATED THEREWITH

(71) Applicant: Workhorse Group Inc., Sharonville, OH (US)

(72) Inventor: Robert Willison, Lebanon, OH (US)

(73) Assignee: Workhorse Group Inc., Sharonville, OH (US)

( * ) Notice: Subject to any disclaimer, the term of this patent is extended or adjusted under 35 U.S.C. 154(b) by 0 days.

(21) Appl. No.: 18/429,814

(22) Filed: Feb. 1, 2024

(65) Prior Publication Data

US 2024/0166262 A1    May 23, 2024

Related U.S. Application Data

(63) Continuation of application No. 18/125,805, filed on Mar. 24, 2023, now Pat. No. 11,891,120, which is a
(Continued)

(51) Int. Cl.
*B62D 23/00* (2006.01)
*B60R 9/00* (2006.01)
(Continued)

(52) U.S. Cl.
CPC ............... *B62D 23/00* (2013.01); *B60R 9/00* (2013.01); *B62D 29/046* (2013.01); *B62D 33/06* (2013.01);
(Continued)

(58) Field of Classification Search
CPC ..... B60R 9/065; B60R 9/06; B60R 2011/004; B62D 33/023; B62D 23/00; B62D 29/046;
(Continued)

(56) References Cited

U.S. PATENT DOCUMENTS 4,705,716 A   11/1987   Tang
4,917,430 A    4/1990   Lawrence
(Continued)

FOREIGN PATENT DOCUMENTS

CN   103359174 A    10/2013
CN   113212566 A     8/2021
(Continued)

OTHER PUBLICATIONS

International Search Report; International Searching Authority; International Patent Application No. PCT/US2021/012327; Mar. 9, 2021; 2 pages.
(Continued)

*Primary Examiner* — Jason S Morrow
(74) *Attorney, Agent, or Firm* — Taft Stettinius & Hollister LLP

(57) ABSTRACT

In certain embodiments, an electric vehicle includes a front cage, a rear floor, an intermediate section, a utility cabinet, and a flatbed. In other embodiments, an electric vehicle includes a front cage, a rear floor, an intermediate section, and a flatbed. In some embodiments, the front cage at least partially defines an operator cabin, the rear floor is positioned rearward of the front cage in a longitudinal direction, and the intermediate section is disposed at least partially between the front cage and the rear floor in the longitudinal direction.

20 Claims, 14 Drawing Sheets

Related U.S. Application Data continuation of application No. 17/962,143, filed on Oct. 7, 2022, now Pat. No. 11,613,310, which is a continuation of application No. 17/745,434, filed on May 16, 2022, now Pat. No. 11,472,485, which is a continuation-in-part of application No. 17/716,687, filed on Apr. 8, 2022, now Pat. No. 11,472,484, which is a continuation of application No. 17/552,718, filed on Dec. 16, 2021, now Pat. No. 11,299,208, which is a continuation of application No. 17/142,766, filed on Jan. 6, 2021, now Pat. No. 11,220,297.

(60) Provisional application No. 62/957,577, filed on Jan. 6, 2020.

(51) Int. Cl.

| | | |
|---|---|---|
| B62D 29/04 | (2006.01) | |
| B62D 33/06 | (2006.01) | |
| B29C 69/02 | (2006.01) | |
| B29C 70/28 | (2006.01) | |
| B29K 309/08 | (2006.01) | |
| B29K 311/14 | (2006.01) | |
| B29L 31/30 | (2006.01) | |
| B60K 1/02 | (2006.01) | |
| B62D 25/20 | (2006.01) | |
| B62D 65/10 | (2006.01) | |

(52) U.S. Cl.
CPC ............. *B29C 69/02* (2013.01); *B29C 70/28* (2013.01); *B29K 2309/08* (2013.01); *B29K 2311/14* (2013.01); *B29L 2031/30* (2013.01); *B29L 2031/3055* (2013.01); *B60K 1/02* (2013.01); *B62D 23/005* (2013.01); *B62D 25/20* (2013.01); *B62D 29/043* (2013.01); *B62D 65/10* (2013.01)

(58) Field of Classification Search
CPC ...... B62D 33/02; B62D 33/06; B62D 2/2027; B62D 25/2054
See application file for complete search history.

(56) References Cited

U.S. PATENT DOCUMENTS

| | | |
|---|---|---|
| 5,082,037 A | 1/1992 | Hammons et al. |
| 5,363,939 A | 11/1994 | Catlin |
| 5,642,971 A | 7/1997 | Ragsdale |
| 5,988,473 A | 11/1999 | Hagan et al. |
| 5,997,227 A | 12/1999 | Bundy |
| 6,296,301 B1 | 10/2001 | Schroeder et al. |
| D460,039 S | 7/2002 | Smith |
| 6,926,351 B2 | 8/2005 | Telehowski et al. |
| 6,935,670 B2 | 8/2005 | Bright |
| 6,971,650 B2 | 12/2005 | Marelja |
| 7,984,941 B2 | 7/2011 | Lorenzo et al. |
| 8,127,879 B2 | 3/2012 | Constans |
| 8,240,748 B2 | 8/2012 | Chapman |
| 8,641,133 B1 | 2/2014 | Scaringe et al. |
| 8,991,900 B2 | 3/2015 | Yamaji et al. |
| 9,272,740 B1 | 3/2016 | Portenier |
| 10,207,757 B2 | 2/2019 | Scaringe |
| 10,328,863 B2 | 6/2019 | Spahn et al. |
| 10,479,427 B2 | 11/2019 | Scaringe et al. |
| 10,800,348 B2 | 10/2020 | Beet |
| 10,800,463 B2 | 10/2020 | Beet |
| 10,829,059 B1 | 11/2020 | Addison et al. |
| 10,967,904 B2 | 4/2021 | Penz et al. |
| 11,161,560 B2 | 11/2021 | Anderson et al. |
| 11,273,770 B2 | 3/2022 | Cappuccio |
| 11,351,922 B2 | 6/2022 | Estrada |
| 11,358,655 B2 | 6/2022 | Urban |
| 11,485,215 B1 | 11/2022 | Willison et al. |
| 2008/0003321 A1 | 1/2008 | Kerr et al. |
| 2008/0191506 A1 | 8/2008 | Huotari et al. |
| 2008/0231066 A1 | 9/2008 | Harrell |
| 2010/0025132 A1 | 2/2010 | Hill et al. |
| 2010/0263954 A1 | 10/2010 | Constans |
| 2011/0017527 A1 | 1/2011 | Oriet et al. |
| 2012/0104793 A1 | 5/2012 | Danielson et al. |
| 2012/0104799 A1 | 5/2012 | Danielson et al. |
| 2012/0104803 A1 | 5/2012 | Thomas et al. |
| 2013/0241237 A1 | 9/2013 | Dziuba et al. |
| 2013/0341971 A1 | 12/2013 | Masini et al. |
| 2015/0027795 A1 | 1/2015 | Hirai et al. |
| 2018/0037151 A1 | 2/2018 | Bauer et al. |
| 2018/0345777 A1 | 12/2018 | Birnschein et al. |
| 2020/0369334 A1 | 11/2020 | Lee |
| 2022/0072940 A1 | 3/2022 | Hewitt et al. |
| 2022/0080903 A1 | 3/2022 | Ano |
| 2022/0097615 A1 | 3/2022 | Richter |

FOREIGN PATENT DOCUMENTS

| | | |
|---|---|---|
| EP | 1538072 A1 | 6/2005 |
| EP | 2552763 A2 | 2/2013 |
| EP | 3174680 A2 | 6/2017 |
| EP | 3689717 A1 | 8/2020 |
| FR | 2698601 A1 | 6/1994 |
| WO | 2011145129 A1 | 11/2011 |
| WO | 2016016662 A2 | 2/2016 |
| WO | 2023043650 A1 | 3/2023 |

OTHER PUBLICATIONS

Written Opinion of the International Searching Authority; International Searching Authority; International Patent Application No. PCT/US2021/012327; Mar. 9, 2021; 8 pages.
International Search Report; International Searching Authority; International Patent Application No. PCT/US2021/012330; Mar. 9, 2021; 2 pages.
Written Opinion of the International Searching Authority; International Searching Authority; International Patent Application No. PCT/US2021/012330; Mar. 9, 2021; 9 pages.
International Search Report; International Searching Authority; International Patent Application No. PCT/US2021/012332; Mar. 24, 2021; 2 pages.
Written Opinion of the International Searching Authority; International Searching Authority; International Patent Application No. PCT/US2021/012332; Mar. 24, 2021; 7 pages.
Supplementary European Search Report; European Patent Office; European Application No. 21710384.5; Oct. 21, 2021; 12 pages.
Canadian Office Action; Canadian Intellectual Property Office; Canadian Patent Application No. 3,108,852; Apr. 13, 2022; 8 pages.
Communication pursuant to Article 94(3) EPC; European Patent Office; European Application No. 2170384.5; Apr. 3, 2023; 9 pages.
International Search Report; International Searching Authority; International Patent Application No. PCT/US2023/022426; Jun. 13, 2023; 2 pages.
Written Opinion of the International Searching Authority; International Searching Authority; International Patent Application No. PCT/US2023/022426; Jun. 13, 2023; 3 pages.
Canadian Office Action; Canadian Intellectual Property Office; Canadian Patent Application No. 3,108,852; Oct. 26, 2023; 5 pages.
Canadian Office Action; Canadian Intellectual Property Office; Canadian Patent Application No. 3,178,524; Mar. 20, 2024; 4 pages.

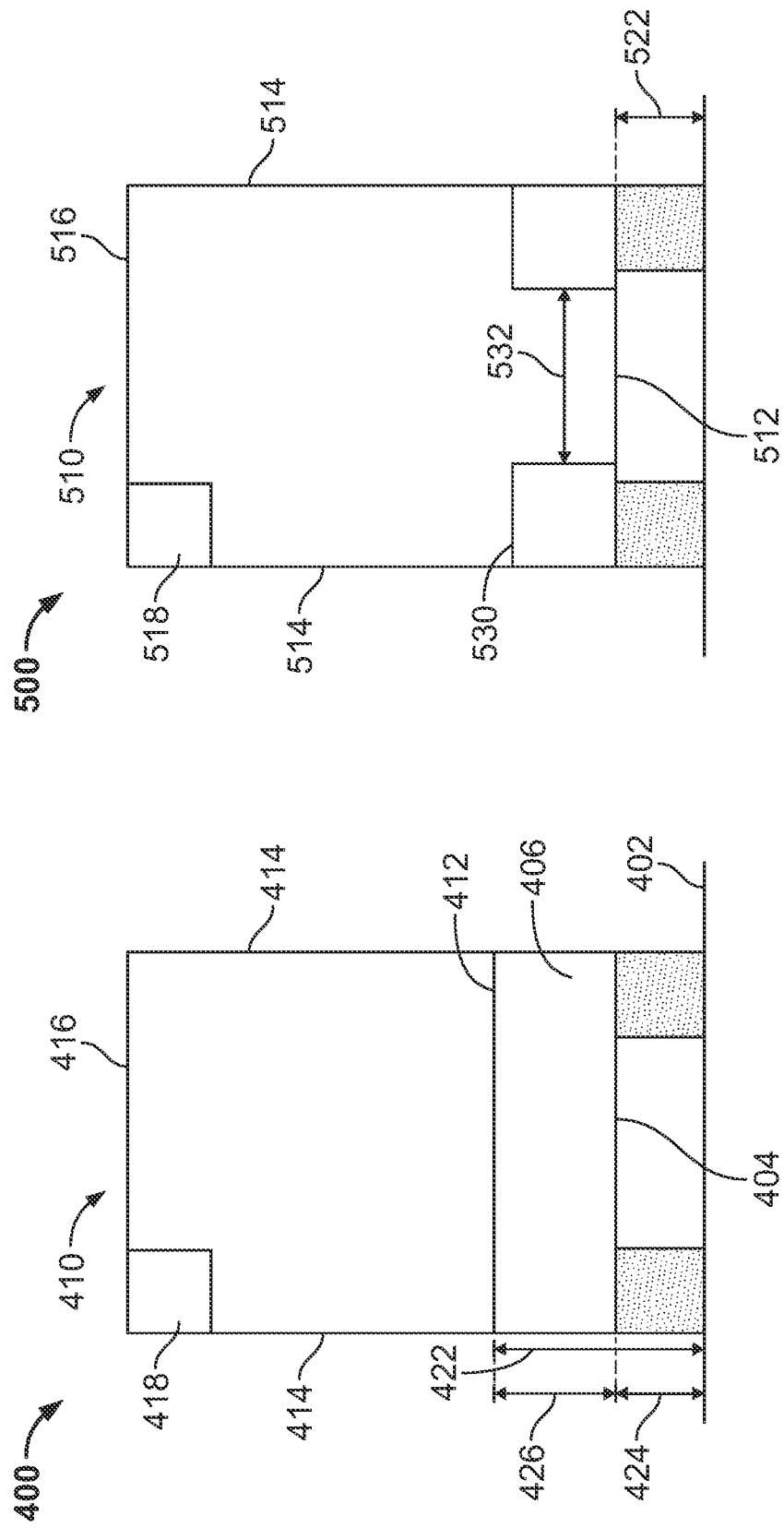

| US Truck Class | Duty Classification | Weight Limit |
| --- | --- | --- |
| Class 1 | Light Truck | 0-6,000 Pounds |
| Class 2a | Light Truck | 6,001-8,500 Pounds |
| Class 2b | Light/Medium Truck | 8,501-10,000 Pounds |
| Class 3 | Medium Truck | 10,001-14,000 Pounds |
| Class 4 | Medium Truck | 14,001-16,000 Pounds |
| Class 5 | Medium Truck | 16,001-19,500 Pounds |
| Class 6 | Medium Truck | 19,501-26,000 Pounds |
| Class 7 | Heavy Truck | 26,001-33,000 Pounds |
| Class 8 | Heavy Truck | 33,001 Pounds + |

FIG. 6

ELECTRIC VEHICLES INCORPORATING FLATBEDS AND METHODS ASSOCIATED THEREWITH

CROSS-REFERENCE TO RELATED APPLICATION(S)

The present application is a continuation of, and claims priority to, U.S. application Ser. No. 18/125,805, which was filed on Mar. 24, 2023, and which is a continuation of U.S. application Ser. No. 17/962,143, which was filed on Oct. 7, 2022 and which issued as U.S. Pat. No. 11,613,310, and which is a continuation of U.S. application Ser. No. 17/745,434, which was filed on May 16, 2022 and which issued as U.S. Pat. No. 11,472,485, and which is a continuation-in-part application of, and claims the priority benefit of, U.S. application Ser. No. 17/716,687, which was filed on Apr. 8, 2022 and which issued as U.S. Pat. No. 11,472,484, and which is a continuation of U.S. application Ser. No. 17/552,718, which issued as U.S. Pat. No. 11,299,208 on Apr. 12, 2022, and which is a continuation application of U.S. application Ser. No. 17/142,766, which issued as U.S. Pat. No. 11,220,297 on Jan. 11, 2022, and which claims priority to, and the benefit of, U.S. Provisional App. Ser. No. 62/957,577, which was filed on Jan. 6, 2020. The contents of those applications are incorporated by reference herein in their entireties.

TECHNICAL FIELD

The present disclosure generally relates to land vehicles and methods of making land vehicles, and, more particularly, to utility and deliver vehicles and methods of making utility and delivery vehicles.

BACKGROUND

Current systems and methods for manufacturing utility and delivery vehicles suffer from a variety of drawbacks and limitations. For those reasons, among others, there remains a need for further improvements in this technological field.

SUMMARY

The present disclosure may comprise one or more of the following features and combinations thereof.

According to one aspect of the present disclosure, an electric vehicle may include a front cage, a rear floor, an intermediate section, a utility cabinet, and a flatbed. The front cage may at least partially define an operator cabin. The rear floor may be positioned rearward of the front cage in a longitudinal direction. The intermediate section may be disposed at least partially between the front cage and the rear floor in the longitudinal direction. The utility cabinet may include a plurality of drawers accessible from a utility space located outside the operator cabin. The flatbed may be at least partially defined by the rear floor. The flatbed may be open to the ambient environment and define the utility space.

In some embodiments, the utility cabinet may be arranged at least partially between the front cage and the rear floor in the longitudinal direction, and when one or more of the plurality of drawers is in a closed state, the one or more of the plurality of drawers in the closed state may be aligned with the intermediate section in the longitudinal direction. When one or more of the plurality of drawers is in an opened state, the one or more of the plurality of drawers in the opened state may extend rearward in the longitudinal direction into the utility space.

In some embodiments, the utility cabinet may extend forward in the longitudinal direction to the front cage. The utility cabinet may extend at least partially into the operator cabin. Additionally, in some embodiments, the utility cabinet may directly contact a rearwardly-facing exterior wall of the front cage that is interconnected with a roof of the front cage, and the exterior wall, the roof, and an uppermost surface of the utility cabinet in a vertical direction may cooperate to define a storage space accessible from the utility space.

In some embodiments, the utility cabinet may be arranged at least partially between the front cage and the rear floor in the longitudinal direction, the intermediate section may include an alcove aligned with the utility cabinet in the longitudinal direction, the alcove may define an opening into the intermediate section in a lateral direction perpendicular to the longitudinal direction, and the opening may be closed off from the operator cabin. Additionally, in some embodiments, the flatbed may include a bench arranged in the utility space that is supported by the rear floor, and the plurality of drawers of the utility cabinet may be disposed above the bench in a vertical direction to permit opening and closing of the plurality of drawers without interference with the bench. In some embodiments still, movement of the vehicle may be driven by one or more electric motors, the vehicle may include a monocoque that at least partially defines the front cage, the rear floor, the intermediate section, and the flatbed, and the monocoque may be formed from composite materials.

In some embodiments, the flatbed may include (i) first sidewall that extends upwardly away from the rear floor in a vertical direction, (ii) a second sidewall arranged opposite the first sidewall that extends upwardly away from the rear floor in the vertical direction, (iii) a rear gate that extends between the first sidewall and the second sidewall in a lateral direction perpendicular to the longitudinal direction to at least partially close off the utility space, (iv) a first guide rail interconnected with the first sidewall that extends upwardly away from the first sidewall in the vertical direction to define a first slot between the first sidewall and the first guide rail, and (v) a second guide rail interconnected with the second sidewall that extends upwardly away from the second sidewall in the vertical direction to define a second slot between the second sidewall and the second guide rail. The flatbed may include (vi) a rear bumper extending rearwardly in the longitudinal direction away from the rear gate and (vii) a vice mounted to the rear bumper.

According to another aspect of the present disclosure, an electric vehicle may include a front cage, a rear floor, an intermediate section, and a flatbed. The front cage may at least partially define an operator cabin having a roof. The rear floor may be positioned rearward of the front cage in a longitudinal direction. The intermediate section may be disposed at least partially between the front cage and the rear floor in the longitudinal direction. The flatbed may be at least partially defined by the rear floor. The flatbed may be open to the ambient environment and define a utility space accessible from a rear end of the vehicle. The flatbed may include a first sidewall that extends upwardly away from the rear floor in a vertical direction to at least partially define the utility space and a second sidewall arranged opposite the first sidewall that extends upwardly away from the rear floor in the vertical direction to at least partially define the utility space. The intermediate section may include a reinforcement beam that is interconnected with the roof at one end thereof and interconnected with one of the first sidewall and the second sidewall at another end thereof opposite the one end.

In some embodiments, the reinforcement beam may extend oblique to the one of the first sidewall and the second sidewall to define an obtuse angle between the reinforcement beam and the one of the first sidewall and the second sidewall. The reinforcement beam may at least partially define an alcove of the intermediate section that is disposed at least partially between the front cage and the rear floor in the longitudinal direction, and the alcove may define an opening into the intermediate section in a lateral direction perpendicular to the longitudinal direction. The flatbed may include a first guide rail interconnected with the first sidewall that extends upwardly away from the first sidewall in the vertical direction to define a first slot between the first sidewall and the first guide rail and a second guide rail interconnected with the second sidewall that extends upwardly away from the second sidewall in the vertical direction to define a second slot between the second sidewall and the second guide rail, and at least one of the first guide rail and the second guide rail may be directly interconnected with the reinforcement beam. The flatbed may include a rear gate that extends between the first sidewall and the second sidewall in a lateral direction perpendicular to the longitudinal direction to at least partially close off the utility space, a rear bumper extending rearwardly in the longitudinal direction away from the rear gate, and a vice mounted to the rear bumper.

In some embodiments, the electric vehicle may include a utility cabinet including a plurality of drawers accessible from the utility space, the utility cabinet may be arranged at least partially between the front cage and the rear floor in the longitudinal direction, and the utility cabinet may extend forward in the longitudinal direction to the front cage. The utility cabinet may extend at least partially into the operator cabin. The utility cabinet may directly contact a rearwardly-facing exterior wall of the front cage that is interconnected with the roof of the front cage, and the exterior wall, the roof, and an uppermost surface of the utility cabinet in the vertical direction may cooperate to define a storage space accessible from the utility space.

According to yet another aspect of the present disclosure, an electric vehicle may include a front cage, a rear floor, an intermediate section, a utility cabinet, and a flatbed. The front cage may at least partially define an operator cabin having a roof. The rear floor may be positioned rearward of the front cage in a longitudinal direction. The intermediate section may be disposed at least partially between the front cage and the rear floor in the longitudinal direction. The utility cabinet may include a plurality of drawers accessible from a utility space located outside the operator cabin. The flatbed may be at least partially defined by the rear floor. The flatbed may be open to the ambient environment and define the utility space. The flatbed may include a first sidewall that extends upwardly away from the rear floor in a vertical direction to at least partially define the utility space and a second sidewall arranged opposite the first sidewall that extends upwardly away from the rear floor in the vertical direction to at least partially define the utility space. The intermediate section may include a reinforcement beam that is interconnected with the roof at one end thereof and interconnected with one of the first sidewall and the second sidewall at another end thereof opposite the one end. The reinforcement beam may extend oblique to the one of the first sidewall and the second sidewall to define an obtuse angle between the reinforcement beam and the one of the first sidewall and the second sidewall.

These and other features of the present disclosure will become more apparent from the following description of the illustrative embodiments.

BRIEF DESCRIPTION OF THE FIGURES

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 4 is a partial schematic rear end view of a conventional delivery vehicle;

FIG. 5 is a partial schematic rear end view of a delivery vehicle according to at least one embodiment of the disclosure;

FIG. 6 is a table illustrating United States standard vehicle classes by gross vehicular weight rating (GVWR);

DETAILED DESCRIPTION OF ILLUSTRATIVE EMBODIMENTS

Figure 1:
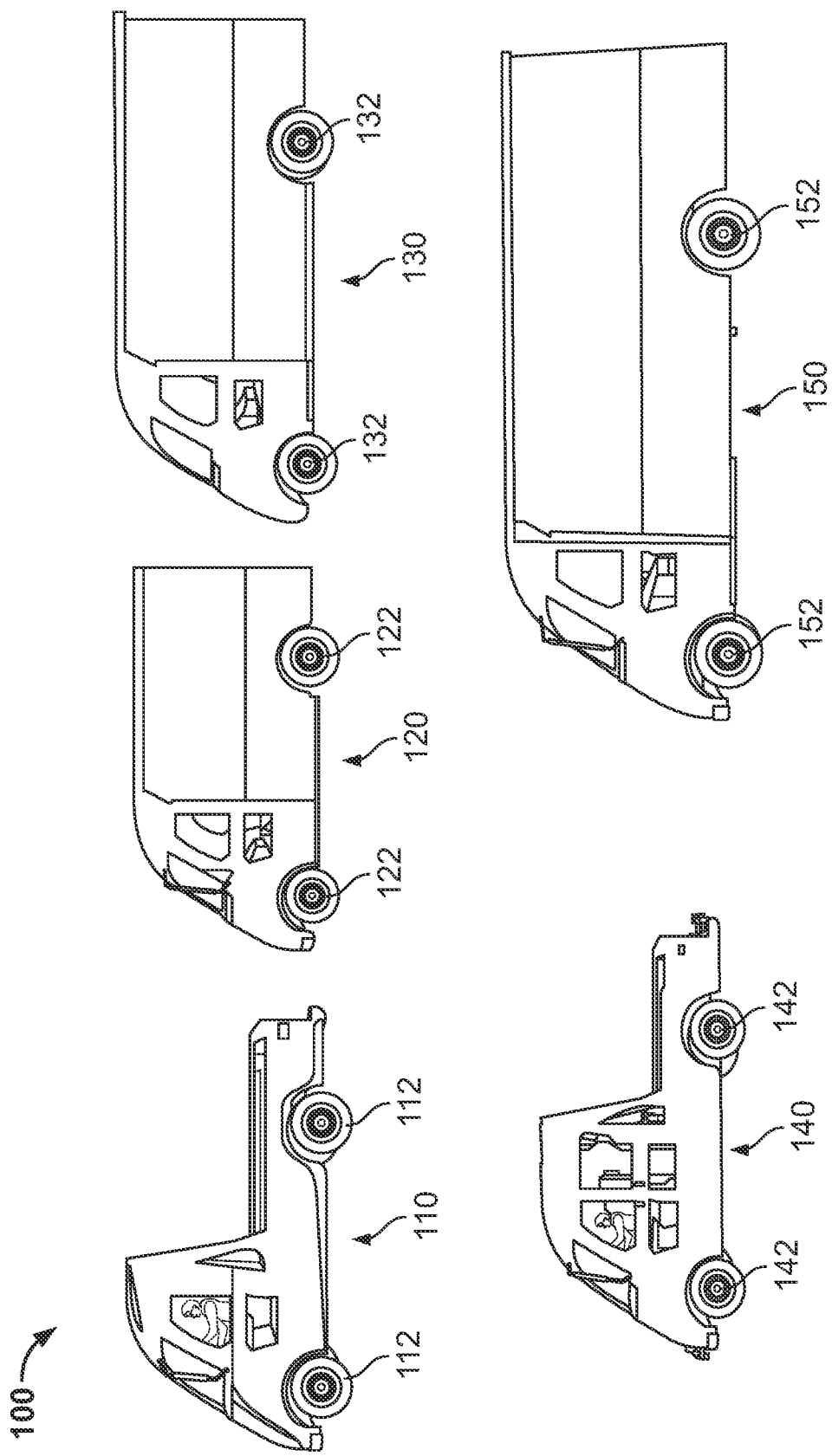
FIG. 1 depicts side elevation views of a number of electric vehicles that may be included in an electric vehicle line according to certain embodiments of the disclosure.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, an illustrative line 100 of land vehicles includes a plurality of land vehicles. In the illustrative embodiment, the land vehicle line 100 includes, but is not limited to, a two-passenger flatbed utility vehicle 110, a 650 cubic foot capacity delivery vehicle 120, a 1000 cubic foot capacity delivery vehicle 130, a six-passenger flatbed utility vehicle 140, and a 1200 cubic foot capacity delivery vehicle 150. However, in some embodiments, the land vehicle line 100 may include any vehicle having a capacity within a particular range, such as a range of from 400 cubic feet to 1400 cubic feet, for example. In keeping with industry terminology, the phrase "cubic foot capacity" may be shortened or abbreviated herein to simply "cube." It should be appreciated that the phrase "cubic foot capacity" as contemplated herein may refer to a storage volume or storage capacity of a particular land vehicle. In any case, as will be apparent from the discussion that follows, one or more vehicles of the vehicle line 100 may be manufactured using the systems and methods described herein.

In the illustrative embodiment, each of the vehicles included in the vehicle line 100 (i.e., each of the vehicles 110, 120, 130, 140, 150) includes a monocoque or unibody 200 (see FIG. 2) supporting wheels (e.g., wheels 112, 122, 132, 142, 152) to permit movement of the particular vehicle relative to an underlying surface in use thereof. As described herein, the monocoque 200 is a single-piece, monolithic structure unsupported by an internal chassis. The monocoque 200 includes a front cage 210 defining an operator cabin 212 and a rear floor 220 positioned rearward of the front cage 210. The monocoque 200 illustratively has a composite construction (e.g., the composite structure 700 shown in FIG. 7) such that each of the front cage 210 and the rear floor 220 are formed from one or more composite materials, as described in greater detail below.

At least some of the vehicles (e.g., the vehicles 110, 140) of the illustrative line 100 may be embodied as, included in, or otherwise adapted for use with, electric utility vehicles. Furthermore, at least some of the vehicles (e.g., the vehicles 120, 130, 150) of the illustrative line 100 may be embodied as, included in, or otherwise adapted for use with, electric vehicles having enclosed stowage compartments. Of course, in other embodiments, it should be appreciated that the vehicles of the line 100 may be embodied as, included in, or otherwise adapted for use with, other suitable vehicles.

It should be appreciated each of the vehicles of the illustrative line 100 may be employed in a variety of applications. In some embodiments, one or more vehicles of the line 100 may be embodied as, or otherwise included in, a fire and emergency vehicle, a refuse vehicle, a coach vehicle, a recreational vehicle or motorhome, a municipal and/or service vehicle, an agricultural vehicle, a mining vehicle, a specialty vehicle, an energy vehicle, a defense vehicle, a port service vehicle, a construction vehicle, and a transit and/or bus vehicle, just to name a few. Additionally, in some embodiments, one or more vehicles of the line 100 may be adapted for use with, or otherwise incorporated into, tractors, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, and marine engines, among other suitable equipment.

In the illustrative embodiment, each of the vehicles of the line 100 includes one or more electric motors (not shown) capable of generating rotational power that may be transmitted to the wheels to drive movement of the vehicle. As such, each of the illustrative vehicles is embodied as, or otherwise includes, an electric vehicle. Details regarding the electric motor(s) included in each vehicle and associated powertrain and/or suspension components are described in U.S. patent application Ser. No. 17/142,814, the contents of which are incorporated herein by reference in their entirety.

Each of the vehicles of the illustrative line 100 does not include an internal combustion engine or powerplant, at least in some embodiments. Furthermore, each of the vehicles of the illustrative line 100 does not include an engine or powerplant housed by the front cage 210 and positioned above an underside 214 of the monocoque 200. Instead, as described in U.S. patent application Ser. No. 17/142,814, multiple electric motors or powerplants are removably coupled to the underside 214 of the monocoque 200 of each vehicle of the illustrative line 100.

It should be appreciated that the vehicles of the illustrative vehicle line 100 may each include one or more features that improve the experience of the driver, the owner, and/or maintenance personnel. Such features may include, but are not limited to, a low floor, a modular battery system, air springs and/or air ride features, an independent rear suspension, an independent front suspension, thermal battery management capability, flexible shelving options, desirable driver sightlines, LED lighting, telematics/driver feedback, features to facilitate maintenance, an aerodynamic body, and advanced safety systems. Further details regarding at least some of these features are provided herein.

Figure 2:
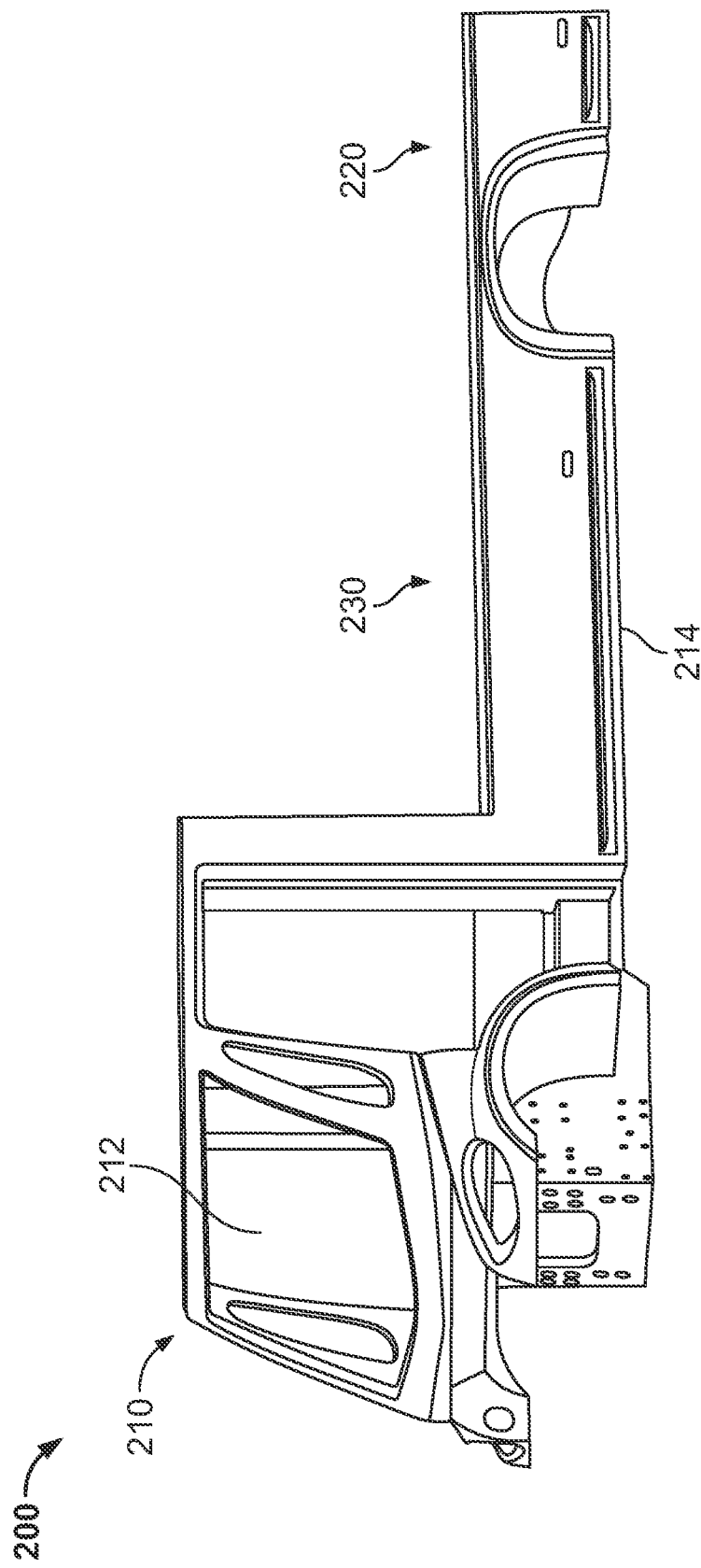
FIG. 2 is a perspective view of a monocoque or unibody that may be incorporated into any electric vehicle of the disclosure.

Referring now to FIG. 2, in addition to the front cage 210 and the rear floor 220, at least in some embodiments, the monocoque 200 includes an intermediate section 230 arranged between the front cage 210 and the rear floor 220. The intermediate section 230 may form a portion of a floor section arranged forward of the rear floor 220. As described in greater detail below with reference to FIG. 8, each of the front cage 210, the rear floor 220, and the intermediate section 230 may be associated with, and formed with, a corresponding mold unit of a modular mold system (e.g., the system 800). Furthermore, as described in greater detail below with reference to FIG. 9, the mold units of the modular mold system may be joined together to form a monocoque mold (e.g., the monocoque mold 900) into which composite materials may be introduced to form the monocoque 200.

In the illustrative embodiment, the monocoque 200 combines what would traditionally be formed from one or more separate structures (e.g., one or more body components and one or more frame components) into a single-piece, monolithic structure. As such, any vehicle of the present disclosure incorporating the monocoque 200 does not include an internal chassis or frame structure that supports separate body components (e.g., panels, doors, etc.). Due at least in part to consolidation of body and frame components into an integrally-formed structure, the illustrative monocoque 200 may be associated with, or otherwise facilitate, improved manufacturability and/or simplified maintenance compared to other configurations.

Depending on the particular vehicle type and monocoque configuration, one or more dimensions of the intermediate section 230 of the monocoque 200 may vary. In one example, the intermediate section 230 may have a first length associated with, and defined by, a small intermediate section mold unit (e.g., the mold unit 832 shown in FIG. 8). In that example, the first length of the intermediate section 230 may at least partially define a stowage compartment of a 650 cubic feet delivery vehicle (e.g., the vehicle 120). In another example, the intermediate section 230 may have a second length associated with, and defined by, a medium intermediate section mold unit (e.g., the mold unit 834 shown in FIG. 8). In that example, the second length of the intermediate section 230 may at least partially define a stowage compartment of a 1000 cubic feet delivery vehicle (e.g., the vehicle 130). In yet another example, the intermediate section 230 may have a third length associated with, and defined by, a large intermediate section mold unit (e.g., the mold unit 836 shown in FIG. 8). In that example, the third length of the intermediate section 230 may at least partially define a stowage compartment of a 1200 cubic feet delivery vehicle (e.g., the vehicle 150).

Furthermore, depending on the particular vehicle type and monocoque configuration, the intermediate section 230 of the monocoque 200 may be omitted entirely. In such embodiments, the front cage 210 and the rear floor 220 may be integrally-formed as a single-piece, monolithic structure without the intermediate section 230 interposed therebetween. It should be appreciated that the utility vehicles 110 and 140 may each include a monocoque formed without the intermediate section 230, at least in some embodiments.

Figure 3:
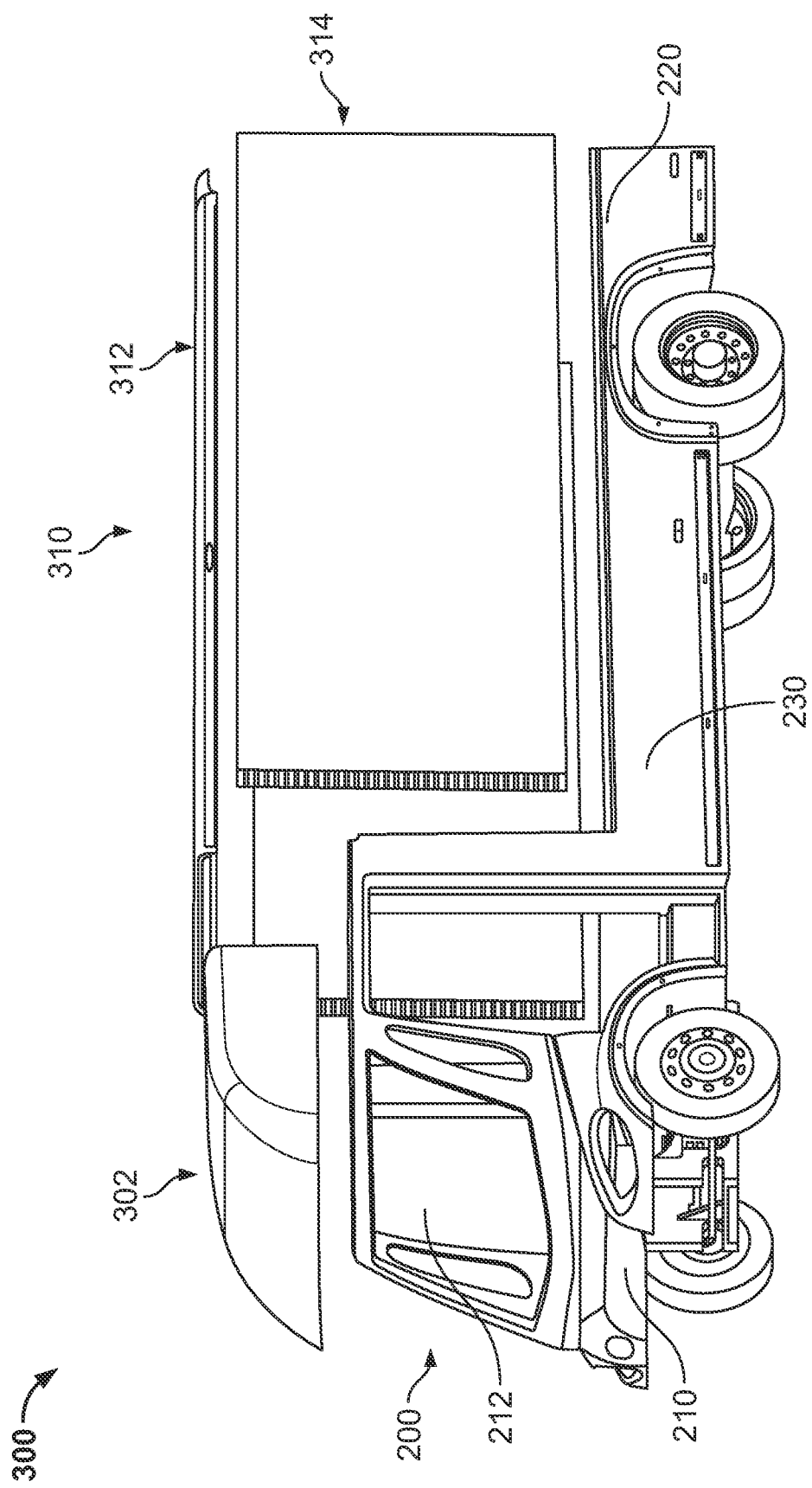
FIG. 3 is a partially exploded assembly view of an electric vehicle according to at least one embodiment of the disclosure.

Referring now to FIG. 3, a vehicle 300 incorporates the monocoque 200 with the intermediate section 230 arranged between the front cage 210 and the rear floor 220. Additionally, the vehicle 300 includes a cab hood 302 arranged above the front cage 210 to enclose the operator cabin 212 and a stowage compartment 310 arranged rearward of the front cage 210 and the cab hood 302. In the illustrative embodiment, the stowage compartment 310 is at least partially defined by the intermediate section 230 and the rear floor 220 and has a roof 312 and sidewalls 314. The illustrative vehicle 300 may be similar to any one of the vehicles 120, 130, 150 discussed above, at least in some embodiments.

Figure 7:
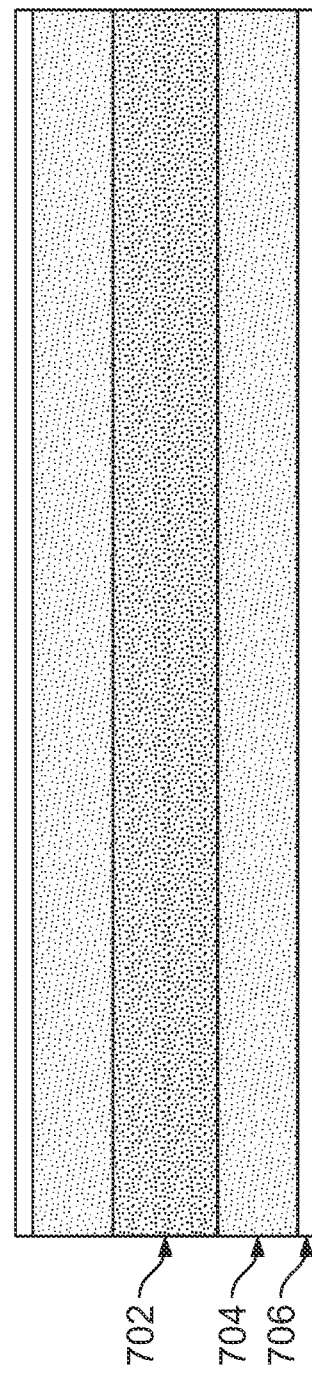
FIG. 7 is a partial schematic depiction of a composite structure that may be used to form a monocoque or unibody of any electric vehicle of the disclosure.

Because the monocoque 200 has a composite construction as indicated above, it should be appreciated that any vehicle described herein that incorporates the monocoque 200 (e.g., any of the vehicles 110, 120, 130, 140, 150, 300, 500) incorporates a composite structure (e.g., the structure 700 shown in FIG. 7). In the case of the vehicle 300, each of the intermediate section 230, the roof 312, and the sidewalls 314 is formed from composite materials and has a composite structure, at least in some embodiments. In those embodiments, each of the intermediate section 230, the roof 312, and the sidewalls 314 does not include metallic material.

Referring now to FIG. 4, a prior art delivery vehicle 400 includes a stowage compartment 410. The stowage compartment 410 includes a floor 412, a pair of sidewalls 414, a ceiling 416, and a refrigeration unit 418 at least partially housed by the stowage compartment 410 and configured to cool the stowage compartment 410. The rear end of the vehicle 400 includes a landing 404 and a step 406 that leads to the floor 412 of the stowage compartment 410.

As depicted in FIG. 4, the landing 404 has a landing height 424 above ground level 402 and the step 406 has a step height 426 above the landing 404. The floor 412 has a floor height 422 above the ground level 402 that includes both the landing height 424 and the step height 426. Typically, the landing height 424 is about 25 inches, the step height 426 is about ten inches, and the floor height 422 is about 35 inches.

Referring now to FIG. 5, a delivery vehicle 500 may include a monocoque (e.g., the monocoque 200) described above with reference to FIG. 2. Furthermore, in some embodiments, the vehicle 500 may be similar to one or more of the vehicles 120, 130, 150 described above. In any case, the illustrative delivery vehicle 500 includes a stowage compartment 510 having a floor 512, a pair of sidewalls 514, and a ceiling 516, as well as a refrigeration unit 518 housed by the stowage compartment 510. Unlike the prior art delivery vehicle 400, however, the vehicle 500 lacks a step corresponding to the step 406. As such, the floor 512 has a floor height 522 that substantially corresponds to, and may be equal to, the landing height 424. The floor height 522 may be less than thirty inches, such as in the range of 22 to 28 inches, for example. A pair of wheel wells 530 formed within the stowage compartment 510 are offset from one another by a separation distance 532. In certain embodiments, the separation distance 532 may be about 50 inches.

In some cases, the prior art delivery vehicle 400 suffers from one or more disadvantages not associated with the illustrative vehicle 500. In one respect, the sidewalls 414 and the ceiling 416 of the prior art vehicle 400 are typically formed of metallic material such as aluminum, for example, which is a poor thermal insulator. As such, the compartment 410 may be poorly insulated and have a tendency to adopt the temperature of the ambient environment relatively quickly. That may be especially the case in the summer when radiant heat from the sun supplements the ambient hot air to exacerbate the warming of the compartment 410. In contrast, the sidewalls 514 and the ceiling 516 of the illustrative vehicle 500 are formed of composite materials, which exhibit superior insulating characteristics compared to metallic material such as aluminum. Accordingly, the compartment 510 is insulated from the ambient environment to a greater degree than the compartment 410. That insulation may be particularly advantageous in cases in which the vehicle 500 is a refrigerated vehicle such as a food delivery vehicle, for instance. It should be appreciated that the insulating properties of the compartment 510 may ease the cooling burden on the refrigeration unit 518 and thereby increase performance of the refrigeration unit 518. Additionally, in certain circumstances, increased performance of the refrigeration unit 518 may enable the vehicle 500 to be provided with a smaller refrigeration unit 518 than would typically be required by the prior art vehicle 400.

Another drawback associated with the prior art vehicle 400 is the elevated nature of the floor 412 relative to the ground level 402. It should be appreciated that the elevated floor 412 is not merely a design choice but rather a feature often necessitated to accommodate inclusion of the internal chassis or frame, the powertrain, and associated components. Put another way, to accommodate the mounting of a conventional internal combustion engine and other powertrain components (e.g., a transmission, transaxle, and/or a differential) to an internal chassis, the floor 412 is elevated above the ground level 402 by the floor height 422. Consequently, the elevated floor 412 reduces the storage capacity and/or volume of the stowage compartment 410 and requires the provision of the step 406. Delivery personnel using the vehicle 400 must therefore step up onto the landing 404 and ascend the step 406 in order to access the compartment 410.

The illustrative vehicle 500 obviates a number of the aforementioned disadvantages by eliminating the necessity of the elevated floor 412. Due in part to the provision of the monocoque 200 as a single-piece, monolithically formed structure having a relatively lightweight composite construction, and due in part to the absence of powertrain components typically provided in other configurations (e.g., a central drive shaft beneath the underside 214 of the monocoque 200 that provides a rotational input to a differential), the floor 512 need not be elevated above the ground level like the floor 412. As a result, the vehicle 500 allows increased stowage capacity of the stowage compartment 510 to be achieved without raising the ceiling 516. Moreover, because a step similar to the step 406 may be omitted from the vehicle 500, the floor height 522 corresponds to the landing height 424 of the conventional vehicle 400, and delivery personnel may avoid the effort of ascending both the landing 404 and the step 406 to access the stowage compartment 510 of the vehicle 500. Notably, it should be appreciated that a rear bumper of the vehicle 500 may be slightly lower than the floor 512 and that delivery personnel may access the compartment 510 by first stepping on the rear bumper. In some embodiments, the rear bumper may have a height of about 20 inches above the ground level, whereas the floor 512 may have a height of about 25 inches above the ground level.

Referring now to FIG. 6, in the United States, trucks are often classified according to their gross vehicular weight rating (GVWR). Those truck classifications, the associated duty classifications, and the corresponding GVWRs are illustrated in the table 600. In the illustrative embodiment, one or more of the vehicles 110, 120, 130, 140, 150 has a GVWR (i.e., accounting for the weight of the truck when empty and the payload carrying capacity of the truck when full) of between 6,000 pounds and 19,800 pounds. In some embodiments, one or more of the vehicles 110, 120, 130, 140, 150 has a GVWR of between 10,001 pounds and 14,000 pounds such that one or more of the vehicles 110, 120, 130, 140, 150 is embodied as, or otherwise includes, a Class 3 truck. In one particular example, in some embodiments, the 1000 cubic foot capacity vehicle 130 weighs roughly 6,500 pounds when empty and has a 6,000 pound payload capacity such that the vehicle 130 has a GVWR of about 12,500 pounds. Of course, it should be appreciated that in other embodiments, the vehicle line 100 may include one or more vehicles in Class 3, one or more vehicles in Class 4, and/or one or more vehicles in Class 5.

In some embodiments, the systems and methods described herein may find particular utility in connection with delivery vehicles in Classes 3 through 5. For example, the methods 1000, 1100, 1300 described below may be utilized to form a monocoque for a delivery vehicle having a GVWR between 10,001 pounds and 19,500 pounds. The stowage capacity of such a vehicle may be between 450 cubic feet and 1200 cubic feet. In certain embodiments, the stowage compartment (e.g., the compartment 510) of the vehicle may be isolated from the operator cabin (e.g., the operator cabin 212) of the vehicle.

Referring now to FIG. 7, any vehicle of the present disclosure includes a monocoque having the composite structure 700. In the illustrative embodiment, the composite structure 700 incorporates one or more relatively lightweight, low-density materials to impart a relatively lightweight construction to the vehicle. As discussed below, the illustrative composite structure 700 includes one or more of the following: balsa wood, plastic, fiberglass, resin, Kevlar, honeycomb, and carbon fiber. The composite structure 700 does not include, and is not formed from, metallic material, at least in some embodiments. In those embodiments, the monocoque (e.g., the monocoque 200) incorporating the composite structure 700 does not include metallic material.

The illustrative composite structure 700 includes a core 702 and a shell 704 that at least partially surrounds the core 702. In the illustrative embodiment, the core 702 is formed from balsa wood and/or one or more of the following composite, non-metallic materials: unidirectional fiberglass, multi-directional fiberglass, Kevlar, carbon fiber, plastic, honeycomb, or other suitable composite, non-metallic materials. Of course, in other embodiments, the core 702 may be formed from other suitable materials to provide a relatively lightweight construction to the composite structure 700. The illustrative shell 704 is formed from fiberglass and resin. However, in other embodiments, the shell 704 may be formed from other suitable materials. Additionally, in the illustrative embodiment, the composite structure 700 includes a laminate layer 706 that at least partially covers the shell 704.

It should be appreciated that the composite structure 700 used to form the monocoque of any vehicle of the present disclosure offers a number of advantages over multi-piece metallic constructions of conventional vehicles. In one respect, the single-piece monolithic structure formed with the composite structure 700 has fewer parts and offers greater structural simplicity than vehicle constructions requiring multiple parts. In another respect, the structural simplicity afforded by the composite structure 700 may facilitate maintenance and improve structural efficiency. In yet another respect, due to a lack of metallic material, the composite structure 700 may minimize or eliminate rust and/or corrosion and thereby have a service life that exceeds the service life of vehicles having conventional constructions. In some instances, monocoques incorporating composite structures 700 consistent with the teachings of the present disclosure may have service lives of 20 years or more.

Figure 8:
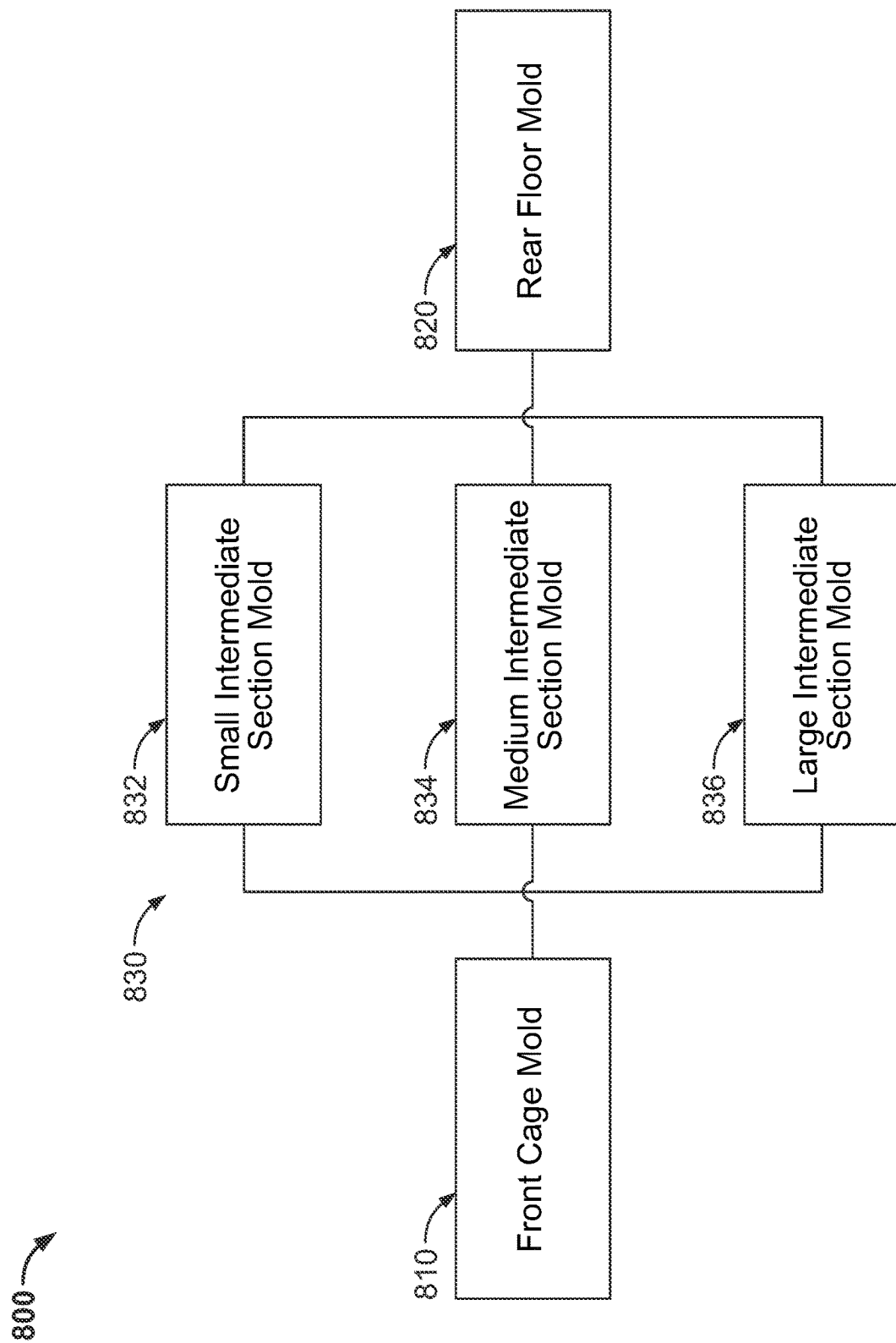
FIG. 8 is a diagrammatic depiction of at least one modular mold system according to certain embodiments of the disclosure.
Figure 9:
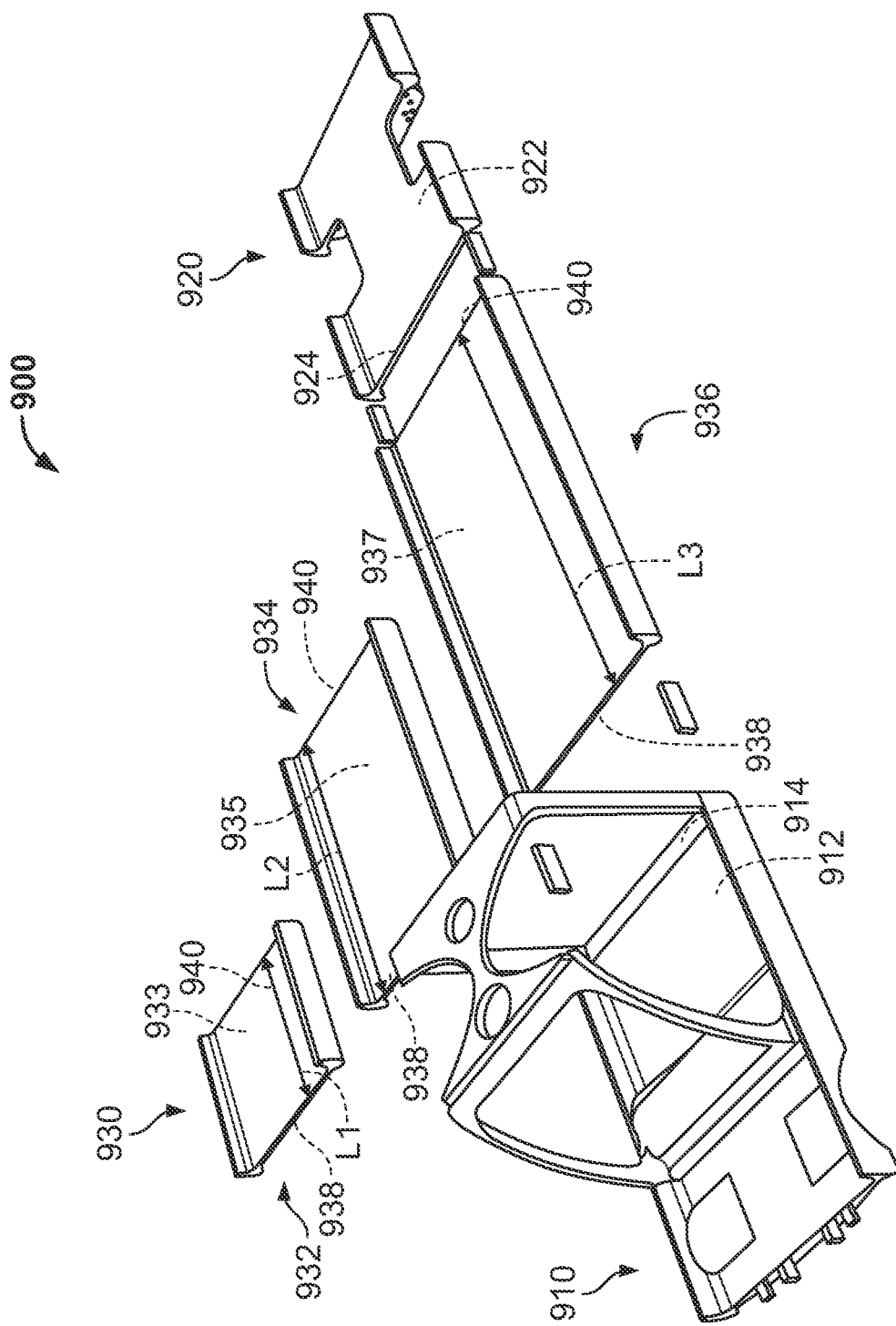
FIG. 9 is a perspective view of a monocoque system formed from a number of mold units included in the at least one modular mold system of FIG. 8.

Referring now to FIGS. 8 and 9, a modular mold system 800 (see FIG. 8) includes a number of illustrative mold units that may be selected and arranged to form a monocoque system 900 (see FIG. 9). It should be appreciated that when arranged to form the monocoque system 900, the selected mold units of the modular system 800 are utilized to form a monocoque such as the above-described monocoque 200, for example. Furthermore, it should be appreciated that similar reference numerals in the 800 and 900 series are used to designate corresponding features of the modular mold system 800 and the monocoque system 900.

The illustrative mold system 800 includes a front cage mold unit 810, a rear floor mold unit 820, and a plurality of intermediate mold units 830 having a small intermediate section mold unit 832, a medium intermediate section mold unit 834, and a large intermediate section mold unit 836. As discussed below, each of the mold units 810, 820, 832, 834, 836 has a mold cavity having a size and a shape corresponding to a corresponding feature of the monocoque system 900 such that subsequent to introduction of the composite materials (e.g., the materials of the composite structure 700) into the mold cavity, the corresponding feature of the monocoque system 900 will be formed. Accordingly, the front cage mold unit 810 includes a front cage mold cavity 912 that has a size and a shape corresponding to the front cage 910 of the monocoque system 900 (and also the front cage 210). The rear floor mold unit 820 includes a rear floor mold cavity 922 that has a size and a shape corresponding to the rear floor 920 of the monocoque system 900 (and also the rear floor 220). The intermediate mold units 832, 834, 836 include respective intermediate mold cavities 933, 935, 937 each having a size and a shape corresponding to the respective intermediate section 932, 934, 936 of the monocoque system 900 (and also the intermediate section 230).

As evident from FIGS. 8 and 9, each of the intermediate mold units 832, 834, 836 is sized for positioning between the front cage mold unit 810 and the rear floor mold unit 820 to form the monocoque system 900. It should be appreciated that any one of the intermediate mold units 832, 834, 836 may be selected and arranged between the front cage mold unit 810 and the rear floor mold unit 820 to form the monocoque system 900. Selection of the particular mold unit 832, 834, 836 is based on the configuration of the vehicle and the monocoque included therein, as further discussed below.

In the illustrative embodiment, the front cage mold cavity 912 of the front cage mold unit 810 has an opening 914 at a rear end thereof (i.e., the end closest to one of the intermediate sections 932, 934, 936 as shown in FIG. 9) to establish a fluidic coupling between the cavity 912 and another component of the mold system 800. In some embodiments, a fluidic coupling may be established between the front cage mold cavity 912 and one of the intermediate mold cavities 933, 935, 937 when the front cage mold unit 810 is arranged contiguously with one of the corresponding intermediate mold units 832, 834, 836. Additionally, in some embodiments, a fluidic coupling may be established between the front cage mold cavity 912 and the rear floor mold cavity 922 when the front cage mold unit 810 is arranged contiguously with the rear floor mold unit 820.

In the illustrative embodiment, the rear floor mold cavity 922 of the rear floor mold unit 820 has an opening 924 at a front end thereof (i.e., the end closest to one of the intermediate sections 932, 934, 936 as shown in FIG. 9) to establish a fluidic coupling between the cavity 922 and another component of the mold system 800. Each of the intermediate mold cavities 933, 935, 937 of the intermediate mold units 832, 834, 836 has an opening 938 at a front end thereof (i.e., the end closest to the front cage 910 as shown in FIG. 9) and an opening 940 at a rear end thereof (i.e., the end closest to the rear floor 920 as shown in FIG. 9). When one of the intermediate mold units 832, 834, 836 is arranged contiguously with the front cage mold unit 810, a fluidic coupling is established between the corresponding intermediate mold cavity 933, 935, 937 and the front cage mold cavity 912 via the openings 914, 938. Additionally, when one of the intermediate mold units 832, 834, 836 is arranged contiguously with the rear floor mold unit 820, a fluidic coupling is established between the corresponding intermediate mold cavity 933, 935, 937 and the rear floor mold cavity 922 via the openings 924, 940.

It should be appreciated that the front end of each of the illustrative intermediate mold units 832, 834, 836 is configured for direct connection and attachment to the rear end of the front cage mold unit 810. Furthermore, it should be appreciated that the rear end of each of the illustrative intermediate mold units 832, 834, 836 is configured for direct connection and attachment to the front end of the rear floor mold unit 820. Consequently, when any one of the intermediate mold units 832, 834, 836 is directly connected with the front cage mold unit 810 and the rear floor mold unit 820, the front cage mold cavity 912, the corresponding intermediate mold cavity 933, 935, 937, and the rear floor mold cavity 922 are fluidically coupled to one another in a contiguous arrangement to establish a continuous monocoque mold cavity into which composite materials may be introduced to form the monocoque as a single-piece, monolithic structure.

It should also be apparent that the rear end of the illustrative front cage mold unit 810 is configured for direct connection and attachment to the front end of the rear floor mold unit 820. As a result, when the front cage mold unit 810 is directly connected to the rear floor mold unit 820, the front cage mold unit 810 and the rear floor mold unit 820 are fluidically coupled to one another in a contiguous arrangement to establish a continuous monocoque mold cavity into which composite materials may be introduced to form the monocoque as a single-piece, monolithic structure.

In the illustrative embodiment, the small intermediate section mold unit 832 has a length L1 as suggested by FIG. 9. The medium intermediate section mold unit 834 has a length L2 that is greater than the length L1, at least in some embodiments. The large intermediate section mold unit 836 has a length L3 that is greater than the length L2 and the length L1, at least in some embodiments.

In some embodiments, the small intermediate section mold unit 832 may be used to form the intermediate section 932 of the monocoque system 900 such that the monocoque at least partially produced using the mold unit 832 is included in a vehicle having a storage volume of 650 cubic feet (e.g., the vehicle 120). Additionally, in some embodiments, the medium intermediate section mold unit 834 may be used to form the intermediate section 934 of the monocoque system 900 such that the monocoque at least partially produced using the mold unit 834 is included in a vehicle having a storage volume of 1000 cubic feet (e.g., the vehicle 130). In some embodiments still, the large intermediate section mold unit 836 may be used to form the intermediate section 936 of the monocoque system 900 such that the monocoque at least partially produced using the mold unit 836 is included in a vehicle having a storage volume of 1200 cubic feet (e.g., the vehicle 150).

Figure 10:
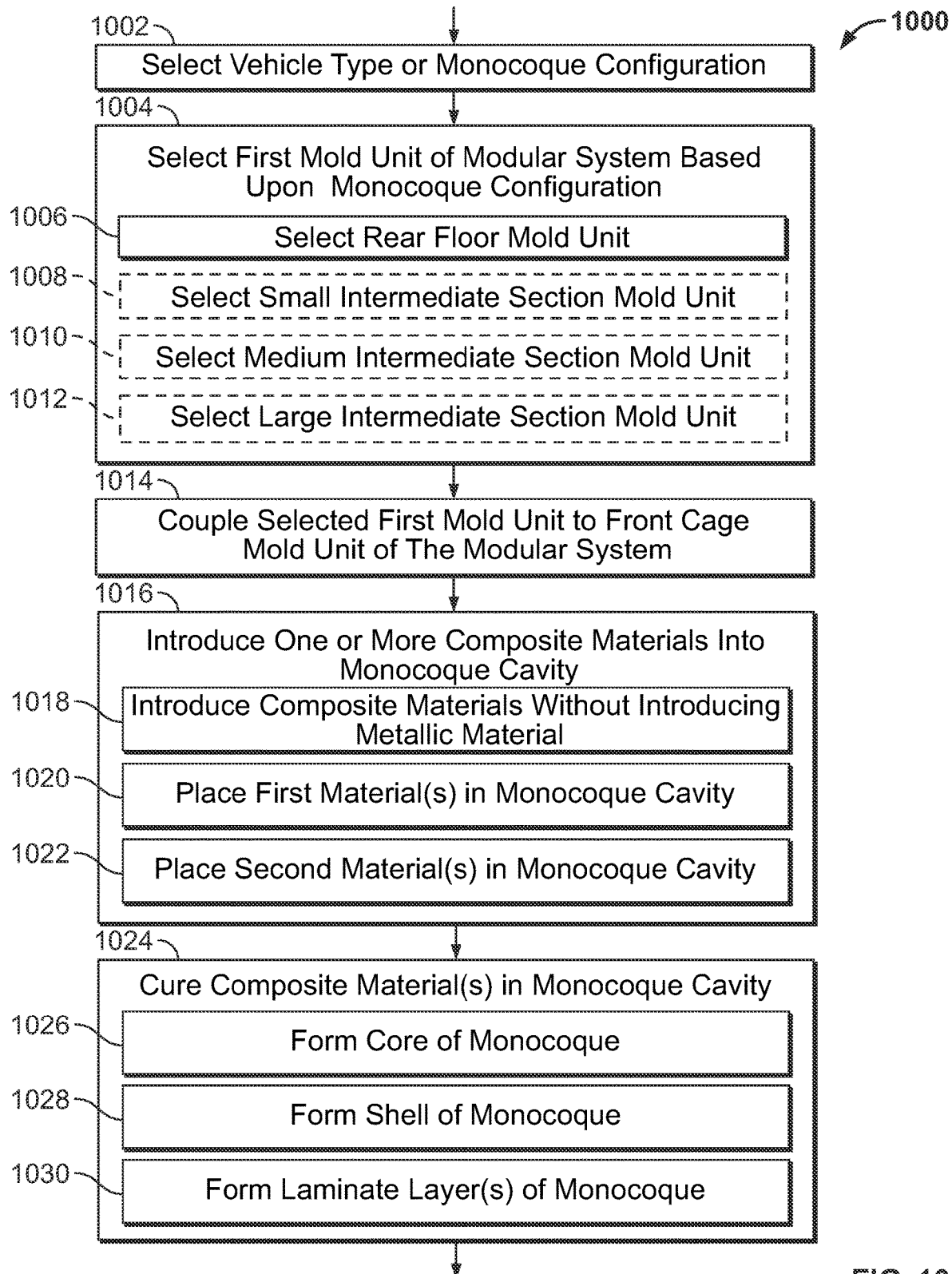
FIG. 10 is a simplified flowchart of a method of forming a monocoque of an electric vehicle using one modular mold system according to one embodiment of the disclosure.

Referring now to FIG. 10, an illustrative method 1000 of forming a monocoque (e.g., the monocoque 200) using a modular mold system (e.g., the system 800) is depicted. The method 1000 corresponds to, or is otherwise associated with, performance of the blocks described below in the illustrative sequence of FIG. 10. It should be appreciated, however, that the method 1000 may be performed in one or more sequences different from the illustrative sequence. Furthermore, it should be appreciated that one or more of the blocks described below may be executed contemporaneously and/or in parallel with one another. In some embodiments, the method 1000 may be performed manually by one or more operators. In other embodiments, the method 1000 may be embodied as, or otherwise include, a set of instructions that are performed by an automated control system.

The illustrative method 1000 begins with block 1002. In block 1002, the operator(s) or the control system selects a land vehicle type or a monocoque configuration for a particular land vehicle. It should be appreciated that to perform block 1002, the operator(s) or the control system may select any vehicle envisioned by the present disclosure or any monocoque configuration associated with a particular vehicle contemplated by the present disclosure. From block 1002, the method 1000 subsequently proceeds to block 1004.

In block 1004 of the illustrative method 1000, the operator(s) or the control system selects a first mold unit of the modular mold system based upon the selected vehicle type or monocoque configuration. In the illustrative embodiment, to perform block 1004, the operator(s) or the control system selects the rear floor mold unit 820 of the modular system 800 in block 1006. However, in other embodiments, it should be appreciated that block 1004 may be performed by selecting (i) the small intermediate section mold unit 832 (i.e., in block 1008), (ii) the medium intermediate section mold unit (i.e., in block 1010), or (iii) the large intermediate section mold unit 836 (i.e., in block 1012). Selection of one of the intermediate mold units 832, 834, 836 as the first mold unit is described in greater detail below with reference to FIG. 11. In any case, from block 1004, the method 1000 subsequently proceeds to block 1014.

In block 1014 of the illustrative method 1000, the operator(s) or the control system couples the selected first mold unit to the front cage mold unit 810 of the modular system 800. It should be appreciated that to perform block 1014, the selected first mold unit (i.e., the rear floor mold unit 820) is coupled to the front cage mold unit 810 such that the front cage mold cavity 912 is fluidly coupled to the rear floor mold cavity 922 to at least partially establish a continuous monocoque mold cavity. Following performance of block 1014, the method 1000 proceeds to block 1016.

In block 1016 of the illustrative method 1000, the operator(s) or the control system introduces one or more composite materials (e.g., the composite materials included in the composite structure 700) into the continuous monocoque mold cavity formed in block 1014. More specifically, to perform block 1016, at least in some embodiments, the operator(s) or the control system performs blocks 1018, 1020, and 1022. In block 1018, the operator(s) or the control system introduces one or more composite materials into the continuous monocoque mold cavity without introducing metallic material into the cavity. In other embodiments, however, block 1018 may be omitted from the method 1000. In block 1020, the operator(s) or the control system places a first material in the continuous monocoque mold cavity. The first material may include balsa wood and/or plastic, at least in some embodiments. In block 1022, the operator(s) or the control system places a second material different from the first material in the continuous monocoque mold cavity. The second material may include fiberglass and resin, at least in some embodiments. Following performance of block 1016, the method 1000 proceeds to block 1024.

In block 1024 of the illustrative method 1000, the operator(s) or the control system cures the one or more composite materials in the continuous monocoque mold cavity to form the monocoque. To perform block 1024, the operator(s) or the control system may perform blocks 1026, 1028, and 1030, at least in some embodiments. In block 1026, the operator(s) or the control system forms a core (e.g., the core 702) including the first material introduced in block 1016. In block 1028, the operator(s) or the control system forms a shell (e.g., the shell 704) including the second material introduced in block 1016 that at least partially surrounds the core. In block 1030, the operator(s) or the control system forms a laminate layer (e.g., the layer 706) that at least partially covers the shell.

Figure 11:
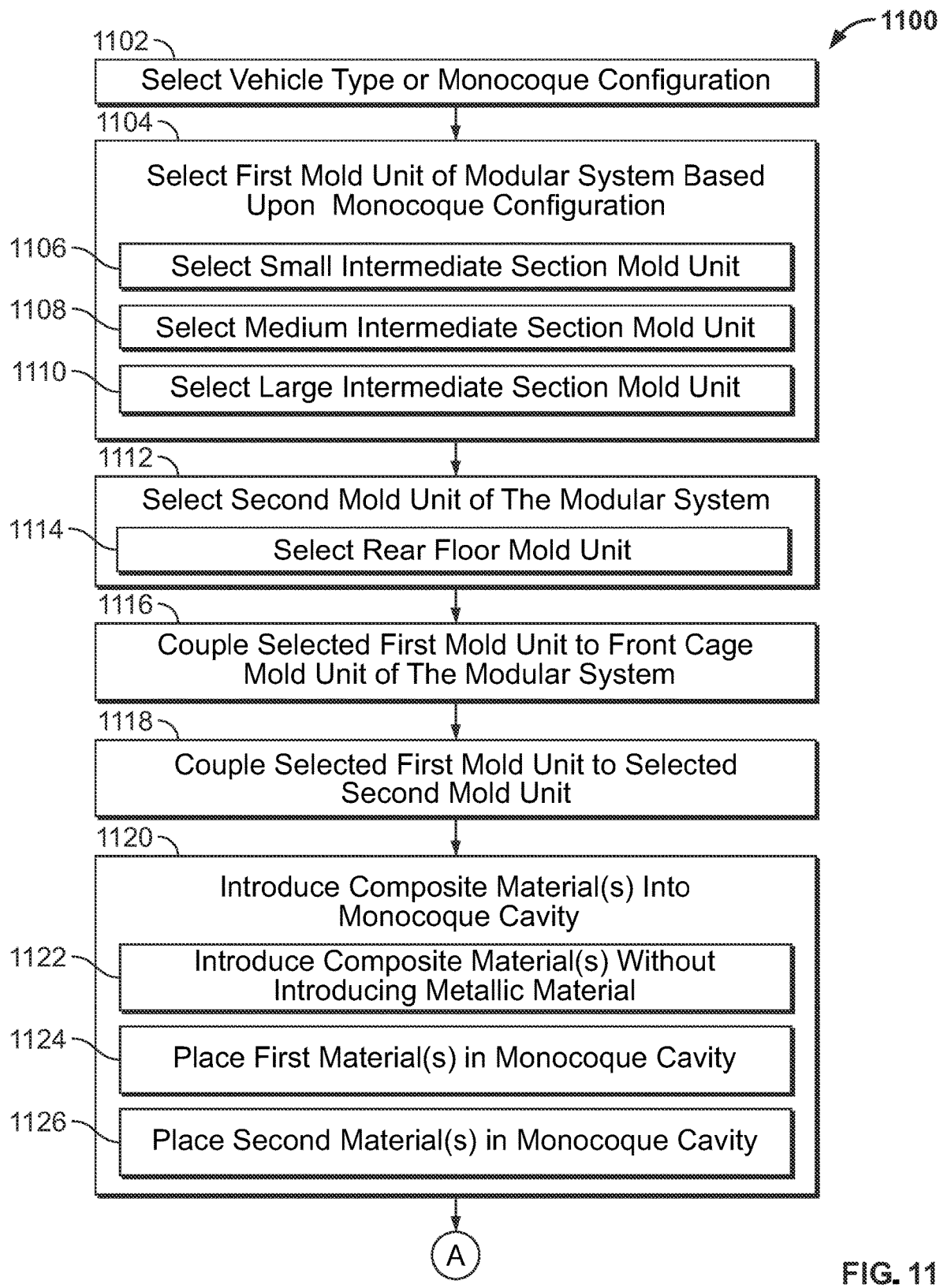
FIG. 11 is a simplified flowchart of one portion of another method of forming a monocoque of an electric vehicle using one modular mold system according to another embodiment of the disclosure.
Figure 12:
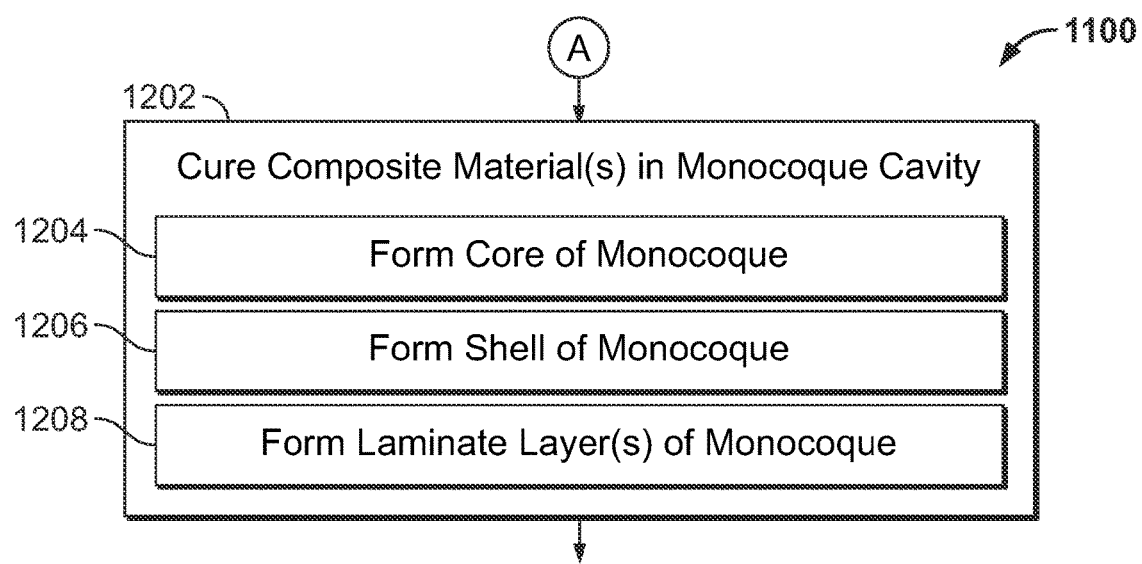
FIG. 12 is a diagrammatic view of another portion of the method of FIG. 11.

Referring now to FIGS. 11 and 12, an illustrative method 1100 of forming a monocoque (e.g., the monocoque 200) using a modular mold system (e.g., the system 800) is depicted. The method 1100 corresponds to, or is otherwise associated with, performance of the blocks described below in the illustrative sequence of FIGS. 11 and 12. It should be appreciated, however, that the method 1100 may be performed in one or more sequences different from the illustrative sequence. Furthermore, it should be appreciated that one or more of the blocks described below may be executed contemporaneously and/or in parallel with one another. In some embodiments, the method 1100 may be performed manually by one or more operators. In other embodiments, the method 1100 may be embodied as, or otherwise include, a set of instructions that are performed by an automated control system.

The illustrative method 1100 begins with block 1102. In block 1102, the operator(s) or the control system selects a land vehicle type or a monocoque configuration for a particular land vehicle. It should be appreciated that to perform block 1102, the operator(s) or the control system may select any vehicle envisioned by the present disclosure or any monocoque configuration associated with a particular vehicle contemplated by the present disclosure. From block 1102, the method 1100 subsequently proceeds to block 1104.

In block 1104 of the illustrative method 1100, the operator(s) or the control system selects a first mold unit of the modular mold system based upon the selected vehicle type or monocoque configuration. In the illustrative embodiment, to perform block 1104, the operator(s) or the control system performs one of blocks 1106, 1108, and 1110. In block 1106, the operator(s) or the control system selects the small intermediate section mold unit 832. In block 1108, the operator(s) or the control system selects the medium intermediate section mold unit 834. In block 1110, the operator(s) or the control system selects the large intermediate section mold unit 836. Following performance of block 1104, the method 1100 proceeds to block 1112.

In block 1112 of the illustrative method 1100, the operator(s) or the control system selects a second mold unit of the modular system. In the illustrative embodiment, to perform block 1112, the operator(s) or the control system performs block 1114. In block 1114, the operator(s) or the control system selects the rear floor mold unit 820 of the modular system 800. From block 1112, the method 1100 subsequently proceeds to block 1116.

In block 1116 of the illustrative method 1100, the operator(s) or the control system couples the selected first mold unit to the front cage mold unit 810 of the modular system 800. It should be appreciated that to perform block 1116, the selected first mold unit (i.e., one of the intermediate mold units 832, 834, 836) is coupled to the front cage mold unit 810 such that the front cage mold cavity 912 is fluidly coupled to the corresponding intermediate mold unit cavity (i.e., one of the cavities 933, 935, 937) to at least partially establish a continuous monocoque mold cavity. Following performance of block 1116, the method 1100 proceeds to block 1118.

In block 1118 of the illustrative method 1100, the operator(s) or the control system couples the selected first mold unit (i.e., one of the intermediate mold units 832, 834, 836) to the selected second mold unit (i.e., the rear floor mold unit 820). It should be appreciated that to perform block 1118, one of the intermediate mold units 832, 834, 836 is coupled to the rear floor mold unit 820 such that the rear floor mold cavity 922 is fluidly coupled to the corresponding intermediate mold unit cavity (i.e., one of the cavities 933, 935, 937) to at least partially establish the continuous monocoque mold cavity. Following performance of block 1118, the method 1100 proceeds to block 1120.

In block 1120 of the illustrative method 1100, the operator(s) or the control system introduces one or more composite materials (e.g., the composite materials included in the composite structure 700) into the continuous monocoque mold cavity formed in block 1118. More specifically, to perform block 1120, at least in some embodiments, the operator(s) or the control system performs blocks 1122, 1124, and 1126. In block 1122, the operator(s) or the control system introduces one or more composite materials into the continuous monocoque mold cavity without introducing metallic material into the cavity. In other embodiments, however, block 1122 may be omitted from the method 1100. In block 1124, the operator(s) or the control system places a first material in the continuous monocoque mold cavity. The first material may include balsa wood and/or plastic, at least in some embodiments. In block 1126, the operator(s) or the control system places a second material different from the first material in the continuous monocoque mold cavity. The second material may include fiberglass and resin, at least in some embodiments. Following performance of block 1120, the method 1000 proceeds to block 1202.

In block 1202 of the illustrative method 1100, the operator(s) or the control system cures the one or more composite materials in the continuous monocoque mold cavity to form the monocoque. To perform block 1202, the operator(s) or the control system may perform blocks 1204, 1206 and 1208, at least in some embodiments. In block 1204, the operator(s) or the control system forms a core (e.g., the core 702) including the first material introduced in block 1120. In block 1206, the operator(s) or the control system forms a shell (e.g., the shell 704) including the second material introduced in block 1120 that at least partially surrounds the core. In block 1208, the operator(s) or the control system forms a laminate layer (e.g., the layer 706) that at least partially covers the shell.

Figure 13:
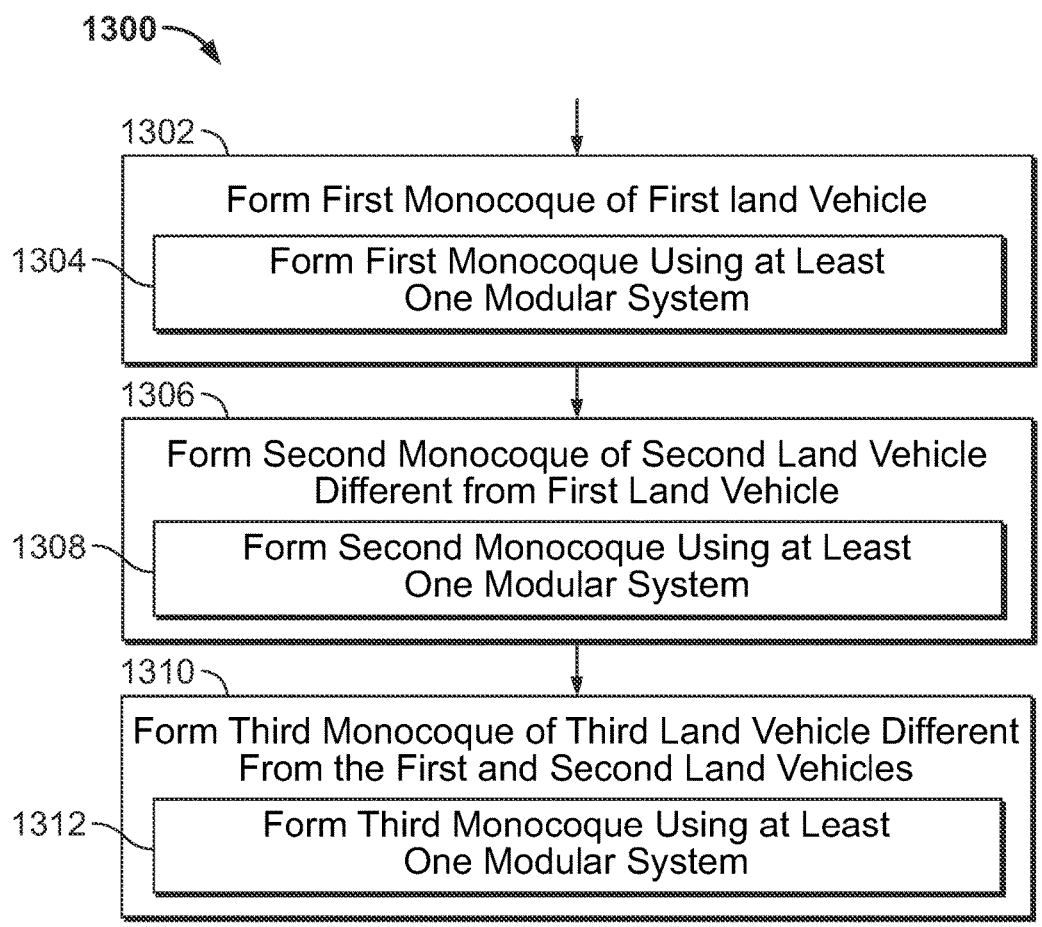
FIG. 13 is a simplified flowchart of a method of forming multiple monocoques of electric vehicles using at least one modular mold system according to yet another embodiment of the disclosure.

Referring now to FIG. 13, an illustrative method 1300 of forming multiple monocoques of land vehicles using at least one modular mold system is depicted. The method 1300 corresponds to, or is otherwise associated with, performance of the blocks described below in the illustrative sequence of FIG. 13. It should be appreciated, however, that the method 1300 may be performed in one or more sequences different from the illustrative sequence. Furthermore, it should be appreciated that one or more of the blocks described below may be executed contemporaneously and/or in parallel with one another. In some embodiments, the method 1300 may be performed manually by one or more operators. In other embodiments, the method 1300 may be embodied as, or otherwise include, a set of instructions that are performed by an automated control system.

The illustrative method 1300 begins with block 1302. In block 1302, the operator(s) or the control system forms a first monocoque of a first land vehicle. To perform block 1302, the operator(s) or the control system forms the first monocoque of the first land vehicle using at least one modular system (e.g., the system 800) in block 1304. In some embodiments, the first monocoque of the first land vehicle is formed using only the front cage mold unit 810 and the rear floor mold unit 820 of the modular system 800. In those embodiments, the first monocoque of the first land vehicle may be formed by performing the method 1000 described above. In other embodiments, the first monocoque of the first land vehicle is formed using the front cage mold unit 810, the rear floor mold unit 820, and one of the intermediate mold units 832, 834, 836. In those embodiments, the first monocoque of the first land vehicle may be formed by performing the method 1100 described above. In any case, following performance of block 1302, the method 1300 proceeds to block 1306.

In block 1306 of the illustrative method 1300, the operator(s) or the control system forms a second monocoque of a second land vehicle that is different from the first land vehicle. To perform block 1306, the operator(s) or the control system forms the second monocoque of the second land vehicle using at least one modular system (i.e., the system 800) in block 1308. In embodiments in which the first monocoque of the first land vehicle is formed in block 1302 using only the front cage mold unit 810 and the rear floor mold unit 820 of the modular system 800 (i.e., according to the method 1000), the second monocoque of the second land vehicle is formed using the front cage mold unit 810, the rear floor mold unit 820, and one of the intermediate mold units 832, 834, 836 (i.e., according to the method 1100). In embodiments in which the first monocoque of the first land vehicle is formed in block 1302 using the front cage mold unit 810, the rear floor mold unit 820, and a first one of the intermediate mold units 832, 834, 836 (i.e., according to the method 1100), the second monocoque of the second land vehicle is formed using the front cage mold unit 810, the rear floor mold unit 820, and a second one of the intermediate mold units 832, 834, 836 that is different from the first one. Regardless, from block 1306, the method 1300 subsequently proceeds to block 1310.

In block 1310 of the illustrative method 1300, the operator(s) or the control system forms a third monocoque of a third land vehicle that is different from the first land vehicle and the second land vehicle. To perform block 1310, the operator(s) or the control system forms the third monocoque of the third land vehicle using at least one modular system (i.e., the system 800) in block 1310. In embodiments in which (i) the first monocoque of the first land vehicle is formed in block 1302 using only the front cage mold unit 810 and the rear floor mold unit 820 of the modular system 800 (i.e., according to the method 1000) and (ii) the second monocoque of the second land vehicle is formed in block 1306 using the front cage mold unit 810, the rear floor mold unit 820, and a first one of the intermediate mold units 832, 834, 836 (i.e., according to the method 1100), the third monocoque of the third land vehicle is formed using the front cage mold unit 810, the rear floor mold unit 820, and a second one of the intermediate mold units 832, 834, 836 that is different from the first one. In embodiments in which (i) the first monocoque of the first land vehicle is formed in block 1302 using the front cage mold unit 810, the rear floor mold unit 820, and a first one of the intermediate mold units 832, 834, 836 (i.e., according to the method 1100) and (ii) the second monocoque of the second land vehicle is formed in block 1306 using the front cage mold unit 810, the rear floor mold unit 820, and a second one of the intermediate mold units 832, 834, 836 that is different from the first one, the third monocoque of the third land vehicle is formed using the front cage mold unit 810, the rear floor mold unit 820, and a third one of the intermediate mold units 832, 834, 836 that is different from the first one and the second one.

Figure 14:
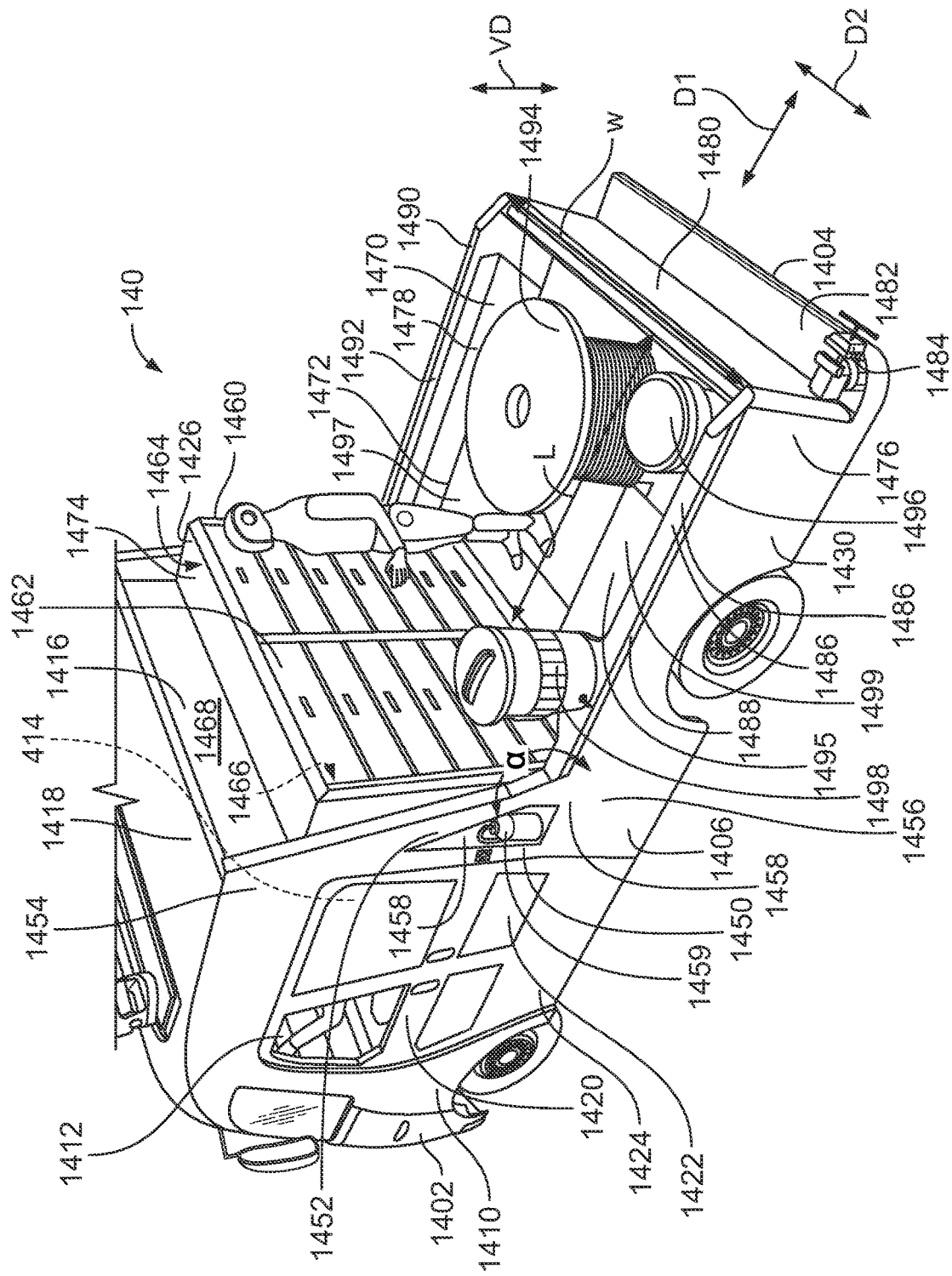
FIG. 14 is a rear perspective view of one of the electric vehicles depicted in FIG. 1.

Referring now to FIG. 14, the six-passenger flatbed utility vehicle 140 shown in FIG. 1 is depicted in greater detail. It should be appreciated that the illustrative vehicle 140 is an electric vehicle as mentioned above. In the illustrative embodiment, the vehicle 140 includes a front cage 1410, a rear floor 1430, an intermediate section 1450, and a flatbed 1470. The front cage 1410 at least partially defines an operator cabin 1412 of the vehicle 140. The rear floor 1430 is positioned rearward of the front cage 1410 in a longitudinal direction D1. The intermediate section 1450 is disposed at least partially between the front cage 1410 and the rear floor 1430 in the longitudinal direction D1. The flatbed 1470 is at least partially defined by the rear floor 1430 and open to the ambient environment. The flatbed 1470 defines a utility space 1472 that is located outside the operator cabin 1412 and accessible from a rear end 1404 of the vehicle 140.

The illustrative vehicle 140 may be formed from the monocoque system 900 and/or the modular mold system 800 described herein. The front cage 1410 may be formed from the front cage mold unit 810, the rear floor 1430 and the flatbed 1470 may be formed from the rear floor mold unit 820, and the intermediate section 1450 may be formed from one of the intermediate mold units 832, 834, 836, at least in some embodiments. Additionally, in some embodiments, the front cage 1410 may be formed from the front cage mold unit 810 having the shape and structure of the mold unit 910, the rear floor 1430 and the flatbed 1470 may be formed from the rear floor mold unit 820 having the shape and structure of the mold unit 920, and the intermediate section 1450 may be formed from one of the intermediate mold units 832, 834, 836 having the shape and structure of the corresponding units 932, 934, 936.

In the illustrative embodiment, the vehicle 140 includes a utility cabinet 1460 having drawers 1462 that are accessible from the utility space 1472. The utility cabinet 1460 is arranged at least partially between the front cage 1410 and the rear floor 1430 in the longitudinal direction D1. As such, in at least some embodiments, the utility cabinet 1460 is aligned with the intermediate section 1450 in the longitudinal direction D1. Additionally, in some embodiments, the utility cabinet 1460 is included in, or otherwise forms a portion of, the intermediate section 1450.

The illustrative utility cabinet 1460 extends forward (i.e., toward a front end 1402 of the vehicle 140) in the longitudinal direction D1 to the front cage 1410. In some embodiments, the utility cabinet 1460 extends at least partially into the operator cabin 1412. In such embodiments, the operator cabin 1412 may define an interior space 1414 (shown in phantom) that receives a portion of the utility cabinet 1460, and positioning of the utility cabinet 1460 in the interior space 1414 may close off, or substantially close off, the interior space 1414 from fluid communication with the utility space 1472.

In some embodiments, the utility cabinet 1460 extends forward in the longitudinal direction D1 to the front cage 1410 such that the utility cabinet 1460 is flush with, and/or in contact with, a wall 1416 of the front cage 1410 that closes off, or substantially closes off, the operator cabin 1412 from fluid communication with the utility space 1472. In such embodiments, the utility cabinet 1460 may not extend into the operator cabin 1412. In such embodiments, the utility cabinet 1460 may be disposed entirely within the utility space 1472.

Each of the drawers 1462 of the utility cabinet 1460 are depicted in FIG. 14 in a closed state 1464. When the drawers 1462 are in the closed state 1464, the drawers 1462 are aligned with the intermediate section 1450 in the longitudinal direction D1. As suggested by FIG. 14, when each of the drawers 1462 is in an opened state 1466 (shown in phantom), each of the drawers 1462 extends rearward (i.e., toward the rear end 1404) in the longitudinal direction D1 into the utility space 1472. Therefore, in at least some embodiments, the drawers 1462 may be at least partially aligned with the rear floor 1430 and the flatbed 1470 in the longitudinal direction D1 in the opened states 1466 thereof.

In some embodiments, the utility cabinet 1460 directly contacts the wall 1416 as indicated above. The wall 1416 illustratively includes, or is otherwise embodied as, a rearwardly-facing exterior wall of the front cage 1410. The wall 1416 extends in a vertical direction VD to a roof 1418 of the front cage 1410 such that the wall 1416 is interconnected with the roof 1418. The wall 1416 extends above a top or uppermost surface 1468 of the utility cabinet 1460 to the roof 1418. The wall 1416, the roof 1418, and the top surface 1468 cooperate to define a storage space 1474 that is accessible from, and in fluid communication with, the utility space 1472.

The illustrative flatbed 1470 of the vehicle 140 includes sidewalls 1476, 1478 arranged opposite one another, a rear gate 1480, a rear bumper 1482, and a vice 1484. Each of the sidewalls 1476, 1478 extends upwardly away from the rear floor 1430 in the vertical direction VD to at least partially define the utility space 1472. Each of the sidewalls 1476, 1478 is formed without an opening extending therethrough. The rear gate 1480 extends between the sidewalls 1476, 1478 in a lateral direction D2 perpendicular to the longitudinal direction D1 to at least partially close off the utility space 1472. The rear bumper 1482 extends rearwardly in the longitudinal direction D1 away from the rear gate 1480. The vice 1484 is mounted to the rear bumper 1482.

In the illustrative embodiment, the flatbed 1470 includes a guide rail 1486 interconnected with the sidewall 1476. The guide rail 1486 extends upwardly away from the sidewall 1476 in the vertical direction VD to define a slot 1488 between the sidewall 1476 and the guide rail 1486. In some embodiments, the guide rail 1486 provides a handle that may be grasped by a subject to provide stability and/or support when the subject is positioned in the utility space 1472 or when the subject is positioned in close proximity to the guide rail 1486 outside the utility space 1472. Additionally, in some embodiments, the guide rail 1486 provides a structure to which other devices (e.g., utility devices, accessories, or articles disposed in the utility space 1472) may be coupled and/or secured to facilitate transport of those devices in use of the vehicle 140.

In the illustrative embodiment, the flatbed 1470 includes a guide rail 1490 interconnected with the sidewall 1478. The guide rail 1490 extends upwardly away from the sidewall 1478 in the vertical direction VD to define a slot 1492 between the sidewall 1478 and the guide rail 1490. In some embodiments, the guide rail 1490 provides a handle that may be grasped by a subject to provide stability and/or support when the subject is positioned in the utility space 1472 or when the subject is positioned in close proximity to the guide rail 1490 outside the utility space 1472. Additionally, in some embodiments, the guide rail 1490 provides a structure to which other devices (e.g., utility devices, accessories, or articles disposed in the utility space 1472) may be coupled and/or secured to facilitate transport of those devices in use of the vehicle 140.

It should be appreciated that a variety of devices may be arranged and/or transported in the utility space 1472 of the vehicle 140 in use thereof. In the illustrative example of FIG. 14, a cable spool 1494, a tub 1496, and a cooler 1498 are disposed in the utility space 1472. The cable spool 1494, the tub 1496, and the cooler 1498 may be tied or tethered to one of the guide rails 1486, 1490, at least in some embodiments. Of course, in other embodiments, other devices may be positioned in the utility space 1472 and secured to one of the guide rails 1486, 1490 depending on the particular mission or application of the vehicle 140.

In some embodiments, the flatbed 1470 includes a bench 1495 arranged in the utility space 1472 and supported by the rear floor 1430. The illustrative bench 1495 is disposed beneath the utility cabinet 1460 in the vertical direction VD. As a result, the drawers 1462 of the utility cabinet 1460 may be opened and closed without interference with the bench 1495. In some embodiments, the bench 1495 may be aligned in the vertical direction VD with a base (not shown) of the utility cabinet 1460 located beneath the drawers 1462.

The illustrative bench 1495 includes a leg 1497 arranged to extend laterally through the utility space 1472 in the lateral direction D2. The bench 1495 also includes a leg 1499 interconnected with the leg 1497 that is arranged to extend longitudinally through the utility space 1472 in the longitudinal direction D1. In some embodiments, the leg 1497 extends laterally through the utility space 1472 over an entire width W of the utility space 1472. In other embodiments, the leg 1497 extends laterally through the utility space 1472 over part of the width W of the utility space 1472. In some embodiments, the leg 1499 extends longitudinally through the utility space 1472 over an entire length L of the utility space 1472. In other embodiments, the leg 1499 extends longitudinally through the utility space 1472 over part of the length L of the utility space 1472.

In the illustrative embodiment, the intermediate section 1450 has a fixed, single length (i.e., in the longitudinal direction D1) and is not adjustable to vary the length thereof. The intermediate section 1450 includes at least one reinforcement beam 1452 that extends between the roof 1418 and the flatbed 1470. More specifically, the illustrative reinforcement beam 1452 is interconnected with the roof 1418 at one end 1454 thereof and interconnected with the sidewall 1476 at another end 1456 thereof opposite the end 1454. In some embodiments, the intermediate section 1450 may include another reinforcement beam (not shown) that is interconnected with the roof 1418 at one end thereof and interconnected with the sidewall 1478 at another end thereof opposite the one end.

The illustrative reinforcement beam 1452 extends oblique to the sidewall 1476 to define an obtuse angle $\alpha$ between the reinforcement beam 1452 and the sidewall 1476. In the illustrative embodiment, the reinforcement beam 1452 is directly interconnected with the guide rail 1486. More specifically, the reinforcement beam 1452 is directly interconnected with the guide rail 1486 in close proximity to an alcove 1458 of the intermediate section 1450.

The reinforcement beam 1452 at least partially defines the alcove 1458 of the intermediate section 1450. The alcove 1458 is disposed at least partially between the front cage 1410 and the rear floor 1430 in the longitudinal direction D1. The alcove 1458 is illustratively aligned with the utility cabinet 1460 in the longitudinal direction D1. In the illustrative embodiment, the alcove 1458 defines an opening 1459 into the intermediate section 1450 in the lateral direction D2. The opening 1459 is closed off from the operator cabin 1412. In some embodiments, the alcove 1458 includes, or is otherwise embodied as, a nook accessible from the utility space 1472 or from outside the vehicle 140 in close proximity to the intermediate section 1450. Additionally, in some embodiments, the alcove 1458 provides an exterior compartment for storing items, such as a fire extinguisher, for example.

In the illustrative embodiment, the front cage 1410 includes doors 1420, 1422 arranged on a driver side 1424 of the vehicle 140. It should be appreciated that corresponding doors (not shown) are arranged on a passenger side 1426 of the vehicle 140 disposed opposite the driver side 1424. The doors 1420, 1422 are illustratively arranged between the front end 1402 of the vehicle 140 and the alcove 1458 in the longitudinal direction D1. The door 1420 is positioned forward of the door 1422 in the longitudinal direction D1. The doors 1420, 1422 and the doors disposed on the passenger side 1426 cooperate to at least partially define the operator cabin 1412, which is configured to accommodate six passengers as indicated above.

The illustrative vehicle 140 includes a monocoque 1406 that at least partially defines the front cage 1410, the rear floor 1430, the intermediate section 1450, and the flatbed 1470. The monocoque 1406 illustratively includes, or is otherwise embodied as, a single-piece, monolithic structure unsupported by an internal chassis. Put differently, the monocoque 1406 does not include an internal chassis, at least in some embodiments. The monocoque 1406 has a composite construction such that the front cage 1410, the rear floor 1430, the intermediate section 1450, and the flatbed 1470 are formed from one or more composite materials. In some embodiments, the monocoque 1406 has the composite structure 700 described above. Additionally, in some embodiments, the monocoque 1406 does not include metallic material.

Figure 15:
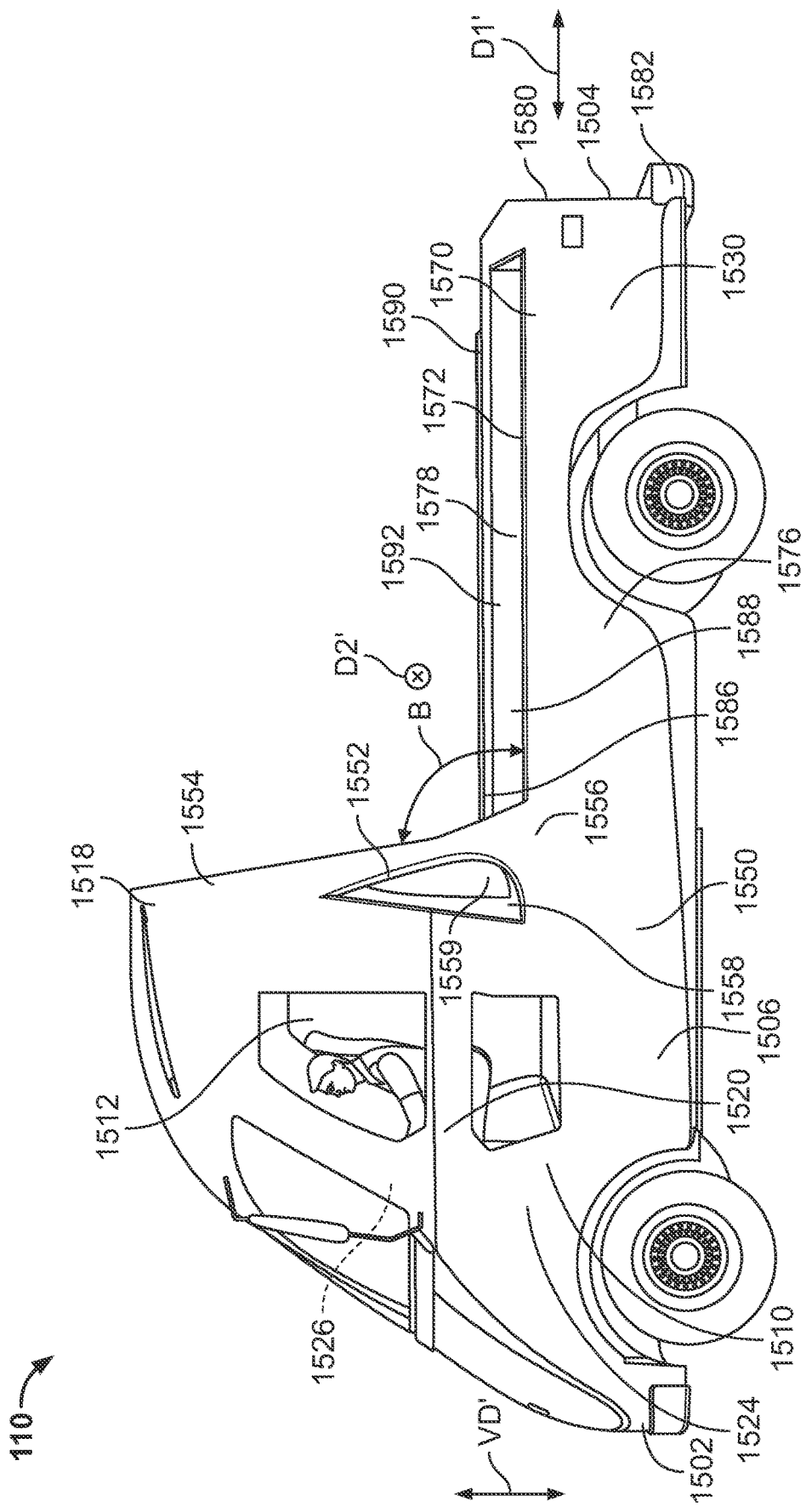
FIG. 15 is a side elevation view of another one of the electric vehicles depicted in FIG. 1.

Referring now to FIG. 15, the two-passenger flatbed utility vehicle 110 shown in FIG. 1 is depicted in greater detail. It should be appreciated that the illustrative vehicle 110 is an electric vehicle as mentioned above. In the illustrative embodiment, the vehicle 110 includes a front cage 1510, a rear floor 1530, an intermediate section 1550, and a flatbed 1570. The front cage 1510 at least partially defines an operator cabin 1512 of the vehicle 110. The rear floor 1530 is positioned rearward of the front cage 1510 in a longitudinal direction D1'. The intermediate section 1550 is disposed at least partially between the front cage 1510 and the rear floor 1530 in the longitudinal direction D1'. The flatbed 1570 is at least partially defined by the rear floor 1530 and open to the ambient environment. The flatbed 1570 defines a utility space 1572 that is located outside the operator cabin 1512 and accessible from a rear end 1504 of the vehicle 110.

The illustrative vehicle 110 may be formed from the monocoque system 900 and/or the modular mold system 800 described herein. The front cage 1510 may be formed from the front cage mold unit 810, the rear floor 1530 and the flatbed 1570 may be formed from the rear floor mold unit 820, and the intermediate section 1550 may be formed from one of the intermediate mold units 832, 834, 836, at least in some embodiments. Additionally, in some embodiments, the front cage 1510 may be formed from the front cage mold unit 810 having the shape and structure of the mold unit 910, the rear floor 1530 and the flatbed 1570 may be formed from the rear floor mold unit 820 having the shape and structure of the mold unit 920, and the intermediate section 1550 may be formed from one of the intermediate mold units 832, 834, 836 having the shape and structure of the corresponding units 932, 934, 936.

The illustrative flatbed 1570 of the vehicle 140 includes sidewalls 1576, 1578 arranged opposite one another, a rear gate 1580, and a rear bumper 1582. Each of the sidewalls 1576, 1578 extends upwardly away from the rear floor 1530 in the vertical direction VD' to at least partially define the utility space 1572. Each of the sidewalls 1576, 1578 is formed without an opening extending therethrough. The rear gate 1580 extends between the sidewalls 1576, 1578 in a lateral direction D2' perpendicular to the longitudinal direction D1' to at least partially close off the utility space 1572. The rear bumper 1582 extends rearwardly in the longitudinal direction D1' away from the rear gate 1580.

In the illustrative embodiment, the flatbed 1570 includes a guide rail 1586 interconnected with the sidewall 1576. The guide rail 1586 extends upwardly away from the sidewall 1576 in the vertical direction VD' to define a slot 1588 between the sidewall 1576 and the guide rail 1586. In some embodiments, the guide rail 1586 provides a handle that may be grasped by a subject to provide stability and/or support when the subject is positioned in the utility space 1572 or when the subject is positioned in close proximity to the guide rail 1586 outside the utility space 1572. Additionally, in some embodiments, the guide rail 1586 provides a structure to which other devices (e.g., utility devices, accessories, or articles disposed in the utility space 1572) may be coupled and/or secured to facilitate transport of those devices in use of the vehicle 110.

In the illustrative embodiment, the flatbed 1570 includes a guide rail 1590 interconnected with the sidewall 1578. The guide rail 1590 extends upwardly away from the sidewall 1578 in the vertical direction VD' to define a slot 1592 between the sidewall 1578 and the guide rail 1590. In some embodiments, the guide rail 1590 provides a handle that may be grasped by a subject to provide stability and/or support when the subject is positioned in the utility space 1572 or when the subject is positioned in close proximity to the guide rail 1590 outside the utility space 1572. Additionally, in some embodiments, the guide rail 1590 provides a structure to which other devices (e.g., utility devices, accessories, or articles disposed in the utility space 1572) may be coupled and/or secured to facilitate transport of those devices in use of the vehicle 110.

It should be appreciated that a variety of devices may be arranged and/or transported in the utility space 1572 of the vehicle 110 in use thereof. Such devices may include the devices 1494, 1496, 1498 described above with reference to FIG. 14, which may be tied or tethered to one of the guide rails 1586, 1590, at least in some embodiments. Of course, in other embodiments, other devices may be positioned in the utility space 1572 and secured to one of the guide rails 1586, 1590 depending on the particular mission or application of the vehicle 110.

In the illustrative embodiment, the intermediate section 1550 has a fixed, single length (i.e., in the longitudinal direction D1') and is not adjustable to vary the length thereof. The intermediate section 1550 includes at least one reinforcement beam 1552 that extends between the roof 1518 and the flatbed 1570. More specifically, the illustrative reinforcement beam 1552 is interconnected with the roof 1518 at one end 1554 thereof and interconnected with the sidewall 1576 at another end 1556 thereof opposite the end 1554. In some embodiments, the intermediate section 1550 may include another reinforcement beam (not shown) that is interconnected with the roof 1518 at one end thereof and interconnected with the sidewall 1578 at another end thereof opposite the one end.

The illustrative reinforcement beam 1552 extends oblique to the sidewall 1576 to define an obtuse angle B between the reinforcement beam 1552 and the sidewall 1576. In the illustrative embodiment, the reinforcement beam 1552 is directly interconnected with the guide rail 1586. More specifically, the reinforcement beam 1552 is directly interconnected with the guide rail 1586 in close proximity to an alcove 1558 of the intermediate section 1550.

The reinforcement beam 1552 at least partially defines the alcove 1558 of the intermediate section 1550. The alcove 1558 is disposed at least partially between the front cage 1510 and the rear floor 1530 in the longitudinal direction D1'. In the illustrative embodiment, the alcove 1558 defines an opening 1559 into the intermediate section 1550 in the lateral direction D2'. The opening 1559 is closed off from the operator cabin 1512. In some embodiments, the alcove 1558 includes, or is otherwise embodied as, a nook accessible from the utility space 1572 or from outside the vehicle 110 in close proximity to the intermediate section 1550. Additionally, in some embodiments, the alcove 1558 provides an exterior compartment for storing items, such as a fire extinguisher, for example.

In the illustrative embodiment, the front cage 1510 includes a door 1520 arranged on a driver side 1524 of the vehicle 110. It should be appreciated that a corresponding door (not shown) is arranged on a passenger side 1526 of the vehicle 110 disposed opposite the driver side 1524. The door 1520 is illustratively arranged between the front end 1502 of the vehicle 110 and the alcove 1558 in the longitudinal direction D1'. The door 1520 and the door disposed on the passenger side 1526 cooperate to at least partially define the operator cabin 1512, which is configured to accommodate two passengers as indicated above.

The illustrative vehicle 110 includes a monocoque 1506 that at least partially defines the front cage 1510, the rear floor 1530, the intermediate section 1550, and the flatbed 1570. The monocoque 1506 illustratively includes, or is otherwise embodied as, a single-piece, monolithic structure unsupported by an internal chassis. Put differently, the monocoque 1506 does not include an internal chassis, at least in some embodiments. The monocoque 1506 has a composite construction such that the front cage 1510, the rear floor 1530, the intermediate section 1550, and the flatbed 1570 are formed from one or more composite materials. In some embodiments, the monocoque 1506 has the composite structure 700 described above. Additionally, in some embodiments, the monocoque 1506 does not include metallic material.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An electric vehicle comprising:
one or more electric motors;
a front cage at least partially defining an operator cabin;
a flatbed positioned rearward of the front cage in a longitudinal direction; and
an intermediate section disposed at least partially between the front cage and the flatbed in the longitudinal direction, wherein the intermediate section includes an alcove that extends in a lateral direction through an exterior wall of the intermediate section to define an exterior compartment accessible from outside the vehicle, and wherein the exterior compartment opens into a utility space of the electric vehicle.

2. The electric vehicle of claim 1, further comprising a monocoque supporting the one or more electric motors.

3. The electric vehicle of claim 2, wherein the monocoque defines the front cage, the flatbed, and the intermediate section.

4. The electric vehicle of claim 1, wherein the exterior compartment is closed off from the operator cabin.

5. The electric vehicle of claim 1, wherein:
the flatbed comprises a first sidewall; and
the intermediate section comprises a first reinforcement beam interconnected with a roof of the front cage at one end thereof and with the first sidewall at another end thereof opposite the one end.

6. The electric vehicle of claim 5, wherein the first reinforcement beam extends oblique to the first sidewall to define an obtuse angle between the first reinforcement beam and the first sidewall.

7. The electric vehicle of claim 5, wherein the first reinforcement beam at least partially defines the alcove.

8. The electric vehicle of claim 5, wherein:
the flatbed comprises a second sidewall; and
the intermediate section comprises a second reinforcement beam interconnected with the roof of the front cage at one end thereof and with the second sidewall at another end thereof opposite the one end.

9. The electric vehicle of claim 8, wherein the second reinforcement beam extends oblique to the second sidewall to define an obtuse angle between the second reinforcement beam and the second sidewall.

10. An electric vehicle comprising:
one or more electric motors;
a front cage at least partially defining an operator cabin;
a flatbed positioned rearward of the front cage in a longitudinal direction including a first sidewall that at least partially defines a utility space of the electric vehicle and a first guide rail interconnected with the first sidewall that extends upwardly away from the first sidewall in a vertical direction to define a first slot between the first sidewall and the first guide rail; and
an intermediate section disposed at least partially between the front cage and the flatbed in the longitudinal direction, wherein the intermediate section includes an alcove that extends in a lateral direction through an exterior wall of the intermediate section to define an exterior compartment accessible from outside the vehicle, and wherein the exterior compartment opens into the utility space of the electric vehicle.

11. The electric vehicle of claim 10, wherein the first slot is in fluid communication with the utility space.

12. The electric vehicle of claim 10, further comprising a monocoque supporting the one or more electric motors that defines the front cage, the flatbed, and the intermediate section.

13. The electric vehicle of claim 10, wherein the intermediate section comprises a first reinforcement beam interconnected with a roof of the front cage at one end thereof and with the first sidewall at another end thereof opposite the one end.

14. The electric vehicle of claim 13, wherein the first reinforcement beam is at least partially disposed between the alcove and the first guide rail in the longitudinal direction.

15. The electric vehicle of claim 13, wherein the first reinforcement beam extends oblique to the first sidewall to define an obtuse angle between the first reinforcement beam and the first sidewall.

16. The electric vehicle of claim 13, wherein the first reinforcement beam at least partially defines the alcove.

17. The electric vehicle of claim 13, wherein:
the flatbed comprises a second sidewall; and
the intermediate section comprises a second reinforcement beam interconnected with the roof of the front cage at one end thereof and with the second sidewall at another end thereof opposite the one end.

18. The electric vehicle of claim 17, wherein the second reinforcement beam extends oblique to the second sidewall to define an obtuse angle between the second reinforcement beam and the second sidewall.

19. The electric vehicle of claim 10, further comprising a monocoque supporting the one or more electric motors that defines the front cage, the flatbed, and the intermediate section, wherein the monocoque is formed from one or more composite materials.

20. An electric vehicle comprising:
one or more electric motors;
a front cage at least partially defining an operator cabin;
a flatbed positioned rearward of the front cage in a longitudinal direction; and
an intermediate section disposed at least partially between the front cage and the flatbed in the longitudinal direction, wherein the intermediate section comprises:

an alcove that extends in a lateral direction through an exterior wall of the intermediate section to define an exterior compartment accessible from outside the vehicle, and a first reinforcement beam interconnected with a roof of the front cage at one end thereof and with a first sidewall of the flatbed at another end thereof opposite the one end.

* * * * *